(12) United States Patent
McClellan

(10) Patent No.: US 8,472,478 B2
(45) Date of Patent: *Jun. 25, 2013

(54) COMMUNICATION SYSTEM AND ENCODING METHOD HAVING LOW OVERHEAD

(75) Inventor: Brett A. McClellan, Laguna Hills, CA (US)

(73) Assignee: Marvell International Ltd., Hamilton (BM)

(*) Notice: Subject to any disclaimer, the term of this patent is extended or adjusted under 35 U.S.C. 154(b) by 258 days.

This patent is subject to a terminal disclaimer.

(21) Appl. No.: 12/924,565

(22) Filed: Sep. 28, 2010

(65) Prior Publication Data

US 2011/0075683 A1    Mar. 31, 2011

Related U.S. Application Data

(63) Continuation of application No. 11/431,929, filed on May 9, 2006, now Pat. No. 7,809,021, and a continuation-in-part of application No. 10/194,741, filed on Jul. 10, 2002, now Pat. No. 7,065,167.

(60) Provisional application No. 60/679,336, filed on May 10, 2005.

(51) Int. Cl.
*H04J 3/00* (2006.01)

(52) U.S. Cl.
USPC ........................... 370/476; 370/477; 370/479

(58) Field of Classification Search
USPC ............... 370/310, 315, 316, 319, 321, 328, 370/329, 335, 336, 337, 347, 389, 395.2, 370/392, 465, 466, 467, 468, 471, 472, 473, 370/476, 470, 474, 475, 477, 479, 498; 714/701, 714/751, 755, 759, 777; 375/E7.138, E7.124, 375/E7.206; 712/200, 201, 208, 225, 220, 712/300

See application file for complete search history.

(56) References Cited

U.S. PATENT DOCUMENTS

| | | | |
|---|---|---|---|
| 3,916,095 | A | 10/1975 | Weber et al. |
| 4,359,778 | A | 11/1982 | Lee |
| 4,583,235 | A | 4/1986 | Dömer et al. |
| 4,606,069 | A | 8/1986 | Johnsen |

(Continued)

OTHER PUBLICATIONS

George Zimmerman, Deep Sleep Idle Concept for PHYs', IEEE P802.3az Energy Efficient Ethernet Task Force, Atlanta, GA, USA, Nov. 11, 2007, slides 3-13.

(Continued)

*Primary Examiner* — Abdullah Riyami

(57) ABSTRACT

A communication system processes blocks of input data that include control words and a packet of information words are received. The packet has a start preceded by ones of the control words and an end followed by others of the control words. When the block consists exclusively of information words, a one bit block header having a first sense is appended to the block to form a frame. When the block does not consist exclusively of information words, the block is condensed to accommodate a TYPE word, the TYPE word is generated and inserted into the block and a one bit block header is appended to the block to form the frame. When the block does not consist exclusively of information words the one bit block header has a second sense, opposite to the first sense. Use of a one bit block header reduces overhead. Forward error correction is also utilized.

16 Claims, 15 Drawing Sheets

U.S. PATENT DOCUMENTS

| | | | |
|---|---|---|---|
| 4,829,422 A | 5/1989 | Morton et al. | |
| 4,878,232 A | 10/1989 | Fisher | |
| 4,956,838 A | 9/1990 | Gilloire et al. | |
| 5,150,381 A | 9/1992 | Forney et al. | |
| 5,222,084 A | 6/1993 | Takahashi | |
| 5,249,200 A | 9/1993 | Chen et al. | |
| 5,293,402 A | 3/1994 | Crespo et al. | |
| 5,297,170 A | 3/1994 | Eyuboglu et al. | |
| 5,301,193 A | 4/1994 | Toyofuku et al. | |
| 5,305,307 A | 4/1994 | Chu | |
| 5,307,405 A | 4/1994 | Sih | |
| 5,388,124 A | 2/1995 | Laroia et al. | |
| 5,633,863 A | 5/1997 | Gysel et al. | |
| 5,646,958 A | 7/1997 | Tsujimoto | |
| 5,778,191 A * | 7/1998 | Levine et al. | 709/247 |
| 5,822,371 A | 10/1998 | Goldstein et al. | |
| 5,856,970 A | 1/1999 | Gee et al. | |
| 5,862,179 A | 1/1999 | Goldstein et al. | |
| 5,896,452 A | 4/1999 | Yip et al. | |
| 5,909,466 A | 6/1999 | Labat et al. | |
| 5,991,308 A * | 11/1999 | Fuhrmann et al. | 370/395.53 |
| 6,032,197 A | 2/2000 | Birdwell et al. | |
| 6,081,502 A | 6/2000 | Paneth et al. | |
| 6,088,345 A * | 7/2000 | Sakoda et al. | 370/335 |
| 6,088,645 A | 7/2000 | Kawasaki et al. | |
| 6,088,827 A | 7/2000 | Rao | |
| 6,147,979 A | 11/2000 | Michel et al. | |
| 6,160,790 A | 12/2000 | Bremer | |
| 6,167,082 A | 12/2000 | Ling et al. | |
| 6,201,831 B1 | 3/2001 | Agazzi et al. | |
| 6,226,332 B1 | 5/2001 | Agazzi et al. | |
| 6,233,104 B1 | 5/2001 | Bell | |
| 6,249,544 B1 | 6/2001 | Azassi et al. | |
| 6,252,904 B1 | 6/2001 | Agazzi et al. | |
| 6,253,345 B1 | 6/2001 | Agazzi et al. | |
| 6,259,729 B1 | 7/2001 | Seki | |
| 6,272,173 B1 | 8/2001 | Hatamian | |
| 6,285,653 B1 | 9/2001 | Koeman et al. | |
| 6,297,647 B2 | 10/2001 | Kirk et al. | |
| 6,304,598 B1 | 10/2001 | Agazzi et al. | |
| 6,351,531 B1 | 2/2002 | Tahernezhaadi et al. | |
| 6,356,555 B1 | 3/2002 | Rakib et al. | |
| 6,414,956 B1 | 7/2002 | Szczepanek | |
| 6,433,558 B1 | 8/2002 | Sciacero et al. | |
| 6,463,041 B1 | 10/2002 | Agazzi | |
| 6,480,532 B1 | 11/2002 | Vareljian | |
| 6,483,521 B1 | 11/2002 | Takahashi et al. | |
| 6,493,448 B1 | 12/2002 | Mann et al. | |
| 6,584,160 B1 | 6/2003 | Amrany et al. | |
| 6,598,203 B1 | 7/2003 | Tang | |
| 6,618,480 B1 | 9/2003 | Polley et al. | |
| 6,636,531 B1 | 10/2003 | Nakashima et al. | |
| 6,650,638 B1 * | 11/2003 | Walker et al. | 370/389 |
| 6,661,807 B1 | 12/2003 | Park et al. | |
| 6,665,402 B1 | 12/2003 | Yue et al. | |
| 6,718,491 B1 * | 4/2004 | Walker et al. | 714/701 |
| 6,751,255 B1 | 6/2004 | Reuven et al. | |
| 6,760,333 B1 | 7/2004 | Moody et al. | |
| 6,813,311 B1 | 11/2004 | Pal et al. | |
| 6,823,483 B1 | 11/2004 | Creigh | |
| 6,826,226 B1 | 11/2004 | Sahlin et al. | |
| 6,862,326 B1 | 3/2005 | Eran et al. | |
| 6,885,679 B1 | 4/2005 | Cheong et al. | |
| 6,947,483 B2 | 9/2005 | Engwer | |
| 6,961,373 B2 | 11/2005 | Jones | |
| 7,088,398 B1 * | 8/2006 | Wolf et al. | 348/423.1 |
| 7,127,653 B1 * | 10/2006 | Gorshe | 714/746 |
| 7,292,567 B2 | 11/2007 | Terrell et al. | |
| 7,366,208 B2 | 4/2008 | Bowes | |
| 7,375,662 B2 | 5/2008 | Wilson et al. | |
| 7,446,774 B1 | 11/2008 | MacInnis et al. | |
| 2001/0036160 A1 | 11/2001 | Curran et al. | |
| 2002/0067824 A1 | 6/2002 | Wang | |
| 2002/0106016 A1 | 8/2002 | Egelmeers et al. | |
| 2002/0129307 A1 * | 9/2002 | Walker et al. | 714/715 |
| 2002/0176492 A1 | 11/2002 | Zangi et al. | |
| 2002/0191552 A1 | 12/2002 | Watkinson | |
| 2003/0020803 A1 * | 1/2003 | Yang et al. | 348/14.01 |
| 2003/0023986 A1 | 1/2003 | Honmura | |
| 2003/0067888 A1 | 4/2003 | Bina et al. | |
| 2003/0095054 A1 * | 5/2003 | Ichino | 341/58 |
| 2003/0108092 A1 | 6/2003 | Gorecki et al. | |
| 2003/0142659 A1 | 7/2003 | Lin et al. | |
| 2003/0185181 A1 * | 10/2003 | Balachandran et al. | 370/337 |
| 2003/0185251 A1 * | 10/2003 | Ichino et al. | 370/535 |
| 2004/0001540 A1 | 1/2004 | Jones | |
| 2004/0022311 A1 | 2/2004 | Zerbe et al. | |
| 2004/0125487 A9 | 7/2004 | Sternad et al. | |
| 2004/0228364 A1 * | 11/2004 | Walker et al. | 370/470 |
| 2006/0041826 A1 * | 2/2006 | Bhattacharya et al. | 714/782 |
| 2006/0133533 A1 | 6/2006 | Khandekar et al. | |
| 2007/0067497 A1 | 3/2007 | Craft et al. | |
| 2007/0101241 A1 * | 5/2007 | Hoyer | 714/776 |
| 2007/0160012 A1 * | 7/2007 | Liu | 370/334 |
| 2007/0195832 A1 * | 8/2007 | Liu | 370/539 |
| 2007/0242670 A1 | 10/2007 | Simonson et al. | |
| 2008/0130655 A1 | 6/2008 | Herbst | |
| 2010/0107032 A1 | 4/2010 | Eroz et al. | |

OTHER PUBLICATIONS

Oscar Agazzi, et al., "10Gb/s PMD Using PAM-5 Trellis Coded Modulation", Broadcom, *IEEE* 802.3, Albuquerque, New Mexico, Mar. 6-10, 2000, 38 pages.

Jamie E. Kardontchik, "4D Encoding in Level-One's Proposal for 1000BAS-T", Advanced Micro Devices, Aug. 21, 1997—Rev. B, pp. 1-24.

Erich F. Haratsch, et al., "A 1-Gb/s Joint Equalizer and Trellis Decoder for 1000BASE-T Gigabit Ethernet", *IEEE Journal of Solid-State Circuits*, vol. 36, No. 3, Mar. 2001, pp. 374-384.

Mehdi Hatamian, et al., "Design Considerations for Gigabit Ethernet 1000Base-T Twisted Pair Transceivers", IEEE 1998 Custom Integrated Circuits Conference, pp. 335-342.

Gottfried Ungerboeck, "Trellis-Coded Modulation with Redundant Signal Sets", *IEEE Communications Magazine*, Feb. 1987, vol. 25, No. 2, pp. 5-21.

"Gigabit Ethernet Over Category 5", Copyright 2000-2001 Agilent Technologies, 12 pages.

M.P. Sellers, et al., "Stabilized Precoder for Indoor Radio Communications", *IEEE Communications Letters*, vol. 4, No. 10, Oct. 2000, pp. 315-317.

"Wirescope 350—Understanding ELFEXT", © 2000 Agilent Technologies, 2 pages.

David Crawford, "Adaptive Filters", © David Crawford 1996, pp. 1-5.

David A. Johns, et al., "Integrated Circuits for Data Transmission Over Twisted-Pair Channels", *IEEE Journal of Solid-State Circuits*, vol. 32, No. 3, Mar. 1997, pp. 398-406.

Prof. David Johns, University of Toronto, "Equalization", © D.A. Johns 1997, 29 pages.

Richard D. Wesel, et al. "Achievable Rates for Tomlinson-Harashima Precoding", *IEEE Transactions on Information Theory*, vol. 44, No. 2, Mar. 1998, pp. 824-831.

Wolfgang H. Gerstacker, et al., "Blind Equalization Techniques for xDSL Using Channel Coding and Precoding", submitted to AEU Int. J. Electr. Commun., May 1999, pp. 1-4.

Chip Fleming, "A Tutorial on Convolutional Coding with Viterbi Decoding", © 1999-2002, Spectrum Applications, pp. 1-6.

David Smalley, "Equalization Concepts: A Tutorial", Atlanta Regional Technology Center Texas Instruments, Oct. 1994, pp. 1-29.

Shao-Po Wu, et al., "FIR Filter Design via Spectral Factorization and Convex Optimization", to appear as Chapter 1 of *Applied Computational Control, Signal and Communications*, Biswa Datta Editor, Birkhausesr, 1977, pp. 1-33.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", *IEEE Std.* 802.3, 1998 Edition, pp. 6-14 and 18-44.

M. Tomlinson, "New Automatic Equalizer Employing Modulo Arithmetic", *Electronic Letters*, vol. 7, 1971, pp. 138-139.

H. Harashima and M. Miyakawa, "Matched-Transmission Technique for Channels with Intersymbol Interference", *IEEE Transactions on Communications*, vol. COM-20, No. 4, Aug. 1972, pp. 774-780.

P. Kabal and S. Pasupathy, "Partial-Response Signaling", *IEEE Transactions on Communications*, vol. COM-23, No. 9, Sep. 1975, pp. 921-934.

R.F.H. Fischer, W.H. Gerstacker, and J.B. Huber, "Dynamics Limited Precoding, Shaping, and Blind Equalization for Fast Digital Transmission Over Twisted Pair Lines", *IEEE Journal on Selected Areas in Communications*, vol. 13, No. 9, Dec. 1995, pp. 1622-1633.

R.F.H. Fischer and J.B. Huber, "Comparison of Precoding Schemes for Digital Subscriber Lines", *IEEE Transactions on Communications*, vol. 45, No. 3, Mar. 1997, pp. 334-343.

Li, M.; Wang, S., T. Tao, T. Kawasniewski, "FIR Filter Optimization as Pre-emphasis of High Speed Backplane Data Transmission", *Electronics Letters*, Jul. 8, 2004, vol. 40, No. 14, 2 pages.

"*Producing a Counter EMF*", http://www.tpub.com/neets/book2/5e.htm, 3 pages (date unknown).

A. Herkersdorf, et al., "A Scalable SDH/SONET Framer Architecture for DATACOM and TELCO Applications", IBM Research, Zurich Research Laboratory, Switzerland, 8 pages (date Unknown).

Christopher T. DiMinico of Cable Design Technologies (CDT) Corporation, Massachusetts and Paul Kish of NORDX/CDT, Montreal, Canada, "Development of Equal Level Far-End Crosstalk (ELFEXT) and Return Loss Specifications for Gigabit Ethernet Operation on Category 5 Copper Cabling", 10 pages (date unknown).

Pedro Silva, et al., "Precoder Circuit for Channels with Multipath Dispersion", Telecommunications Institute, Department of Electronics and Telecommunications Engineering, The University of Aveiro—University Campus, Portugal, 4 pages (date unknown).

Shao-Po Wu, et al., "FIR Filter Design via Semidefinite Programming and Spectral Factorization", Information Systems Laboratory, Stanford University, CA, 6 pages (date unknown).

J. Ježek, Institute of Information Theory and Automation, Prague, Czec Republic, et al., "New Algorithm for Spectral Factorization and its Practical Application", pp. 1-6 (date unknown).

"ADSL Tutorial", http://www.dslforum.org/aboutdsl/ads 1 tutorial.html, pp. 1-3 (date unknown).

"*Introduction to DSP*", http://www.bores.com/courses/intro/filters/4_fir.htm, pp. 1-2 (date unknown).

"QAM_VR-QAM Demodulator with Variable Rate", DesignObjects™ by sci-worx, pp. 1-2 (date unknown).

"*Description of Algorithms (Part I)*". http://pwl.netcom.com/lchip.f/viterbi/algrthms.html, pp. 1-7 (date unknown).

"Continuous Time Aperiodic Signals: The Fourier Transform", http://ece.ucsd.edu/lcruz/ece.101/notes/nodes32.html, pp. 1-2 (date unknown).

"Convolution", http://www.wam.umd.edu/Itoh/spectrum/Convolution.html, pp. 1-2 (date unknown).

"Convolution by DFT", http://www.gresilog.com/english/excommend/doc/convtd.htm, pp. 1-3 (date unknown).

Eyuboglu M V., "Flexible Precoding for V.Fast", Data Transmission—Advances in modem and ISDN Technology and Applications, 1992, UK, IEE, UK I992, pp. 13-18.

"ELFEXT—Introduction", Fluke Networks™, © 2000, pp. 1-2.

"Iowegian's dspGuru FIR FAQ Part 2: Properties", © 1999-2000 Iowegian International Corp., pp. 1-4.

"Tutorial: Adaptive Filter, Acoustic Echo Canceller and its Low Power Implementation", © of Freehand Communication AB, 6 pages (date unknown).

"Fast Fourier Transform", http://cas.ensmp.fr/☐chaplais/Wavetour_presentation/transformees/Fourier/FFTUS.html, pp. 1-2 (date unknown).

Gi-Hong Im, et al., "Performance of a Hybrid Decision Feedback Equalizer Structure for CAP-Based DSL Systems", IEEE Transactions on Signal Processing vol. 49, No. 8, Aug. 2001, pp. 1768-1785.

\* cited by examiner

```
                         131      130
                           \      /
LANE 0   K R K R K A K R [S] D D D D D D D   R K R K R
LANE 1   K R K R K A K R   D D D D D D D D  R K R K R
LANE 2   K R K R K A K R   D D D D D D D[T] R K R K R
LANE 3   K R K R K A K R   D D D D D D D  K\R K R K R
                                               132
```

|  | INFO ONLY | CTRL ONLY | 2 PACKET STARTS | |
|---|---|---|---|---|
| LANE 0 | D D | Z Z | [S] D | Z [S] |
| LANE 1 | D D | Z Z | D D | Z D |
| LANE 2 | D D | Z Z | D D | Z D |
| LANE 3 | D D | Z Z | D D | Z D |
| BLOCK TYPE | 1 | 2 | 3 | 4 |

|  | 8 PACKET ENDINGS | | | | | | | |
|---|---|---|---|---|---|---|---|---|
| LANE 0 | [T] Z | D Z | D Z | D Z | D [T] | D D | D D | D D |
| LANE 1 | Z Z | [T] Z | D Z | D Z | D Z | D [T] | D D | D D |
| LANE 2 | Z Z | Z Z | [T] Z | D Z | D Z | D Z | D [T] | D D |
| LANE 3 | Z Z | Z Z | Z Z | [T] Z | D Z | D Z | D Z | D [T] |
| BLOCK TYPE | 5 | 6 | 7 | 8 | 9 | 10 | 11 | 12 |

TYPE 1

TYPE 2

TYPE 3

TYPE 4

TYPE 5

TYPE 6

TYPE 7  | 0 | AA (TYPE) | D0:8 | D1:8 | ✕ | Z3:7 | Z4:7 | Z5:7 | Z6:7 | Z7:7 |

*FIG. 7G*

TYPE 8  | 0 | B4 (TYPE) | D0:8 | D1:8 | D2:8 | ✕ | Z4:7 | Z5:7 | Z6:7 | Z7:7 |

*FIG. 7H*

TYPE 9  | 0 | CC (TYPE) | D0:8 | D1:8 | D2:8 | D3:8 | ✕ | Z5:7 | Z6:7 | Z7:7 |

*FIG. 7I*

TYPE 10 | 0 | D2 (TYPE) | D0:8 | D1:8 | D2:8 | D3:8 | D4:8 | ✕ | Z6:7 | Z7:7 |

*FIG. 7J*

TYPE 11 | 0 | E1 (TYPE) | D0:8 | D1:8 | D2:8 | D3:8 | D4:8 | D5:8 | ✕ | Z7:7 |

*FIG. 7K*

TYPE 12 | 0 | FF (TYPE) | D0:8 | D1:8 | D2:8 | D3:8 | D4:8 | D5:8 | D6:8 |

*FIG. 7L*

COMMUNICATION SYSTEM AND ENCODING METHOD HAVING LOW OVERHEAD

PRIORITY CLAIM

This application is a continuation application and claims priority to application Ser. No. 11/431,929, filed on May 9, 2006 and issuing as U.S. Pat. No. 7,809,021 which in turn claims priority to both Provisional Patent Application No. 60/679,336 filed on May 10, 2005 and as a continuation-in-part to patent application Ser. No. 10/194,741 filed Jul. 10, 2002 now U.S. Pat. No. 7,065,167.

FIELD OF THE INVENTION

The invention relates to communication systems and in particular to a method and apparatus for coding data to minimize overhead.

RELATED ART

Demand for high rate data transmission continues to increase in response to new service offerings and expanded communication network usage, such as for home and business tasks. For example, audio and video content is growing in popularity and is generally bandwidth intensive. In addition, many tasks are now commonly handled via a computer network, such as ordering business supplies, exchanging documents, and information gathering. Moreover, bandwidth demand placed upon a company's local area network is increasing. Often networks are being burdened with more users and larger and more complex software applications. These applications are bandwidth intensive and the complex software applications create larger files. Although many networks are currently at bandwidth capacity additional demands are continually being placed on these network.

While there are numerous proposed solutions to alleviate network congestion by increasing network speeds, many of these proposed solutions require migration to a different communication standard or a different communication medium than is currently in use. While different communication standards (SONET, ATM) and different communication mediums (fiber optic cable, coaxial cable) may make it possible to increase data rates, the cost associated with migration is extremely prohibitive. For example, installation of an optical network to each computer in a local area network requires significant software and hardware upgrades on each end user's platform and installation of fiber optic cable. The cabling cost alone is tremendous.

Another proposed solution is to increase the transmission rate of existing networks. One widely deployed network standard is Ethernet, which utilizes twisted pairs of copper wires as its transmission medium. Although widely deployed and inexpensive to manufacture, twisted pair copper is bandwidth limited. As a result, data signals transmitted at a high rate over the twisted pair copper, or other medium, are subject to significant levels of distortion and error rates. Upon reception, recovering the transmitted signal may be impossible due to this distortion.

While it is possible to perform signal processing or error correction coding, such prior art attempts have been insufficient to achieve desired data transmission rates with acceptable error rates. For example, some attempts to maximize the throughput and signal to noise margin of the channel through use of integrated circuit systems are simply not possible or feasible with existing semiconductor manufacturing processes.

Previous attempts to achieve these above-mentioned goals have not achieved the desired results, which is high data rate, low error rate, data communication or are not capable of performing as required in different environments. One such example of a prior art system that is configured to code data to reduce effective data rate is set forth in U.S. Pat. No. 6,718, 491, issued to Walker on Apr. 6, 2004 and entitled Coding Method and Coder for Coding Packetized Serial Data with Low Overhead. This proposed method of coding utilizes 64b/66b encoding which is adopted for optical communication. This encoding scheme utilizes 66 bits to represent the 64 received bits. It has however, an undesirably large overhead which makes this encoding scheme, as set forth in the Walker reference undesirable for use in other communication systems.

As a result, there is a need for a method and apparatus to facilitate high-speed data transmission while maintaining low error rates that is capable of overcoming the drawbacks of the art.

SUMMARY

Disclosed herein is a communication system configured to processes blocks of input data that include control words and a packet of information words. The packet has a start preceded by ones of the control words and an end followed by others of the control words. When the block consists exclusively of information words, a one bit block header having a first sense is appended to the block to form a frame. When the block does not consist exclusively of information words, the block is condensed to accommodate a TYPE word, the TYPE word is generated and inserted into the block and a one bit block header is appended to the block to form the frame. When the block does not consist exclusively of information words the one bit block header has a second sense, opposite to the first sense. Use of a one bit block header reduces overhead. Error correction is also utilized.

In one embodiment a 64B/65B coding method for coding a packet of information words into frames for transmission over 4 twisted pair conductor is disclosed. In this example method a system receives blocks of input data such that the input data includes control words and the packet of information words. The packets have a start preceded by ones of the control words and an ending followed by others of the control words and the blocks are smaller than the packet. This method then determines when a block consists exclusively of information words and, when the block consists exclusively of information words, then the method appends to the block a one bit block header having a first sense to form one of the frames. When the block does not consist exclusively of information words then the method condenses the block to accommodate a TYPE word. The method also generates the TYPE word having a value that indicates one of the following structural properties of the block: (a) a position of the start of the packer in the block, (b) a position of the end of the packet in the block, and/or (c) the block being composed exclusively of control words. The method may also insert a TYPE word into the block and append to the block a one bit block header having a second sense, opposite to the first sense, to form the one of the frames. As such, this method reduces overhead to less than 3%.

In one embodiment, this method includes re-coding at least one of the control words using fewer bits. In addition, the type word may be selected from a set of type words having a specified mutual Hamming distance. In one embodiment, the type words each consist of T bits and the method additionally comprises generating the set of possible bit patterns by a process comprising: adopting a (T/2)-bit binary pattern as a first half of a bit pattern in the set of possible bit patterns, and generating a second half of the bit pattern by duplicating or complementing the first half of the bit pattern depending on a bit parity value of the first half of the bit pattern.

It is also contemplated that the one bit block header in the first sense comprises a 1 and a one bit block header in the second sense comprises a 0 value. In addition, the method may be performed in a conjunction with forward error correction. In this method, the step of condensing the block includes removing from the block a control word that indicates one of (a) the start of the packet and (b) the end of packet. Alternatively, condensing the block may include re-coding remaining the control words using fewer bits. This method may be utilized in a 10 gigabit/second communication system.

Also disclosed herein is a communication coder for 64B/65B type coding of blocks of input data into respective frames for transmission over twisted pair conductors. In this example embodiment, the input data includes control words and a packet of information words such that the packet has a start preceded by ones of the control words and an ending followed by others of the control words. The blocks may be smaller than the packet and the frames may include a frame corresponding to the block. In this embodiment the coder comprises a type word generator that receives the block and generates a TYPE word for a block such that the TYPE word has a value that indicates one of the following structural properties of the block, namely, (a) whether the block is composed exclusively of control words, (b) a position of the start of the packet in the block, (c) a position of the end of the packet in the block, and (d) whether the block is composed exclusively of control words. The coder also has a one bit block header generator that operates in response to the TYPE word and generates a one bit block header in a first sense when the TYPE word indicates that the block is composed exclusively of information words, and otherwise generates the one bit block header in a second sense, opposite to the first sense, wherein use of a one bit block header reduces overhead to less than 3%. Also part of the coder is a payload field generator that operates in response to the TYPE word. It adopts the block to form a payload field of the frame when the TYPE word indicates that the block is composed exclusively of information words, and otherwise condenses the block and inserts the TYPE word into the block to form the payload field. A frame assembler is also included and configured to append the block header to the payload field to form the frame.

In one embodiment the payload field generator includes a re-coder that condenses the block by re-coding remaining ones of the control words using fewer bits. It is contemplated that the type word is selected from a set of type words having a specified mutual Hamming distance. For example, the type words may each consist of T bits and the coder may additionally comprises a type word generator that generates the set of possible bit patterns, and the type word generator may include: a first-half generator that adopts a (T/2)-bit binary pattern as a first half of a bit pattern in the set of possible bit patterns, and a second-half generator that generates a second half of the bit pattern by duplicating or complementing the first half of the bit pattern depending on a bit parity value of the first half of the bit pattern. In one embodiment, the coder operates in conjunction with forward error correction. In addition, the coder may be used in a communication system utilizing a channel of 4 twisted pair conductors and the coder's use of a one bit block header establishes an overhead of 1.5625%.

In one embodiment, the payload field generator includes a control word removal module that condenses the block by removing from the block a control word that indicates one of (a) the start of the packet and (b) the end of the packet. In addition, the payload field generator may additionally includes a re-coder that condenses the block by re-coding remaining ones of the control words using fewer bits. Moreover, the re-coder may re-code the control words using codes having a specified mutual Hamming distance.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 7A-7L show specific examples of the frames generated from each of the twelve block types shown in FIGS. 3A-3D, including the block header and the TYPE word, where used.

DETAILED DESCRIPTION

Figure 1A:
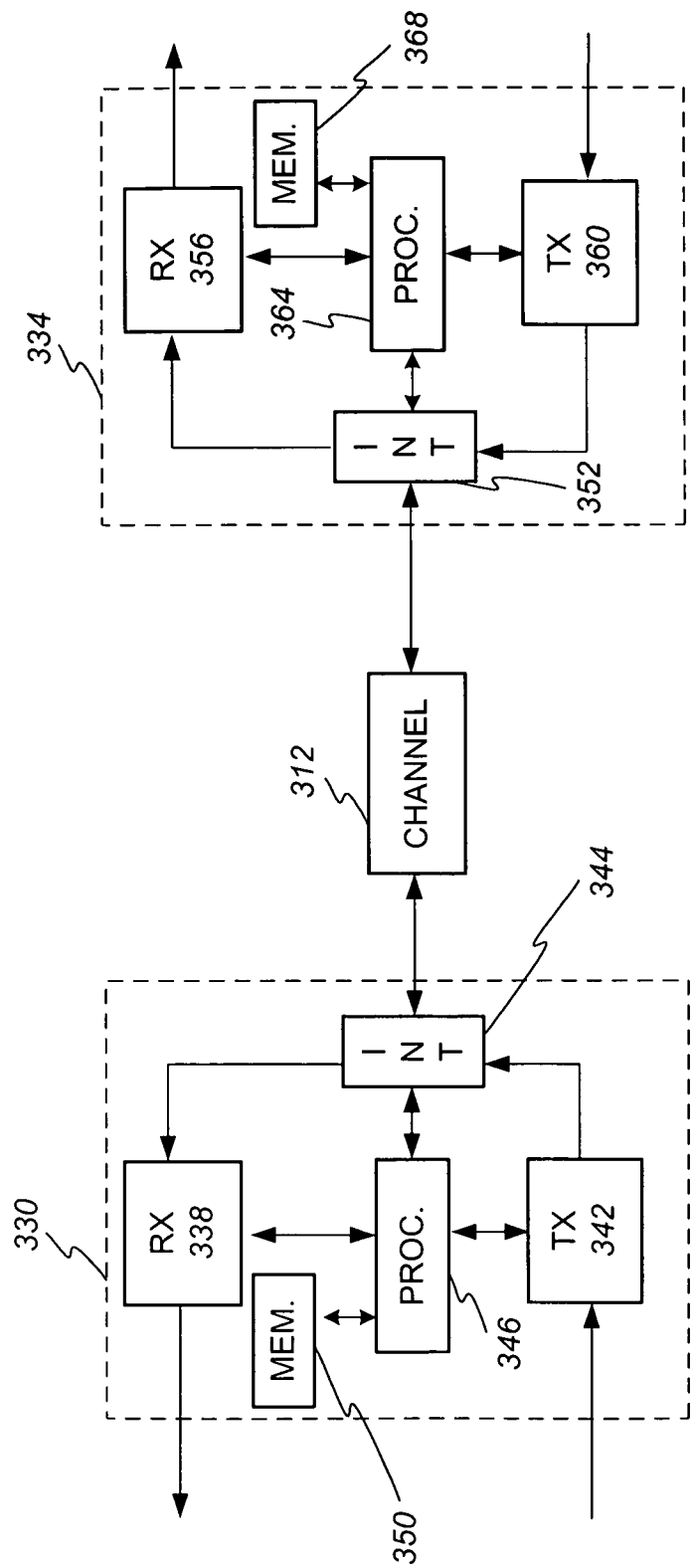
FIG. 1A illustrates a block diagram of an example embodiment of a pair of transceivers configured to communicate over a channel.

In general, the method and apparatus disclosed herein performs data transmission using forward error correction coding in a multi-pair or multi-channel system to achieve data transmission rates and error rates that are better than that achievable by systems of the prior art. The disclosure provided herein is similar to that disclosed in U.S. Pat. No. 6,781,491 which is disclosed herein in its entirety by reference. In reference to FIG. 1A, a block diagram of a receiver/transmitter pair is shown. This is one possible example environment of the method and apparatus disclosed herein. A channel 312 connects a first transceiver 330 to a second transceiver 334. The first transceiver 330 connects to the channel 312 via an interface 344. The interface 344 is configured to isolate the incoming from outgoing signals. In another embodiment the channel 312 may comprises numerous conductors and hence the interface 344 performs isolation and separates the conductors based on direction of data flow to either of a receiver module 338 or a transmitter module 342. The receive module 338 and transmit module 342 may comprise any assembly of hardware, software, or both configured to operate in accordance with the principles described herein.

The receive module 338 and transmit module 342 communicate with a processor 346. The processor 346 may include or communicate with memory 350. The memory 350 may comprise one or more of the following types of memory: RAM, ROM, hard disk drive, flash memory, or EPROM. The processor 346 may be configured to perform one or more calculations or any form of signal analysis. In one embodiment the processor 346 is configured to execute machine readable code stored on the memory 350. The processor 346 may perform additional signal processing tasks as described below.

The second transceiver 334 is configured similarly to the first transceiver 330. The second transceiver 334 comprises an interface 352 connected to a receiver module 356 and a transmitter module 360. The receiver module 356 and a transmitter module 360 communicate with a processor 364, which in turn connects to a memory 368. Operation occurs as described below in more detail.

Figure 1B:
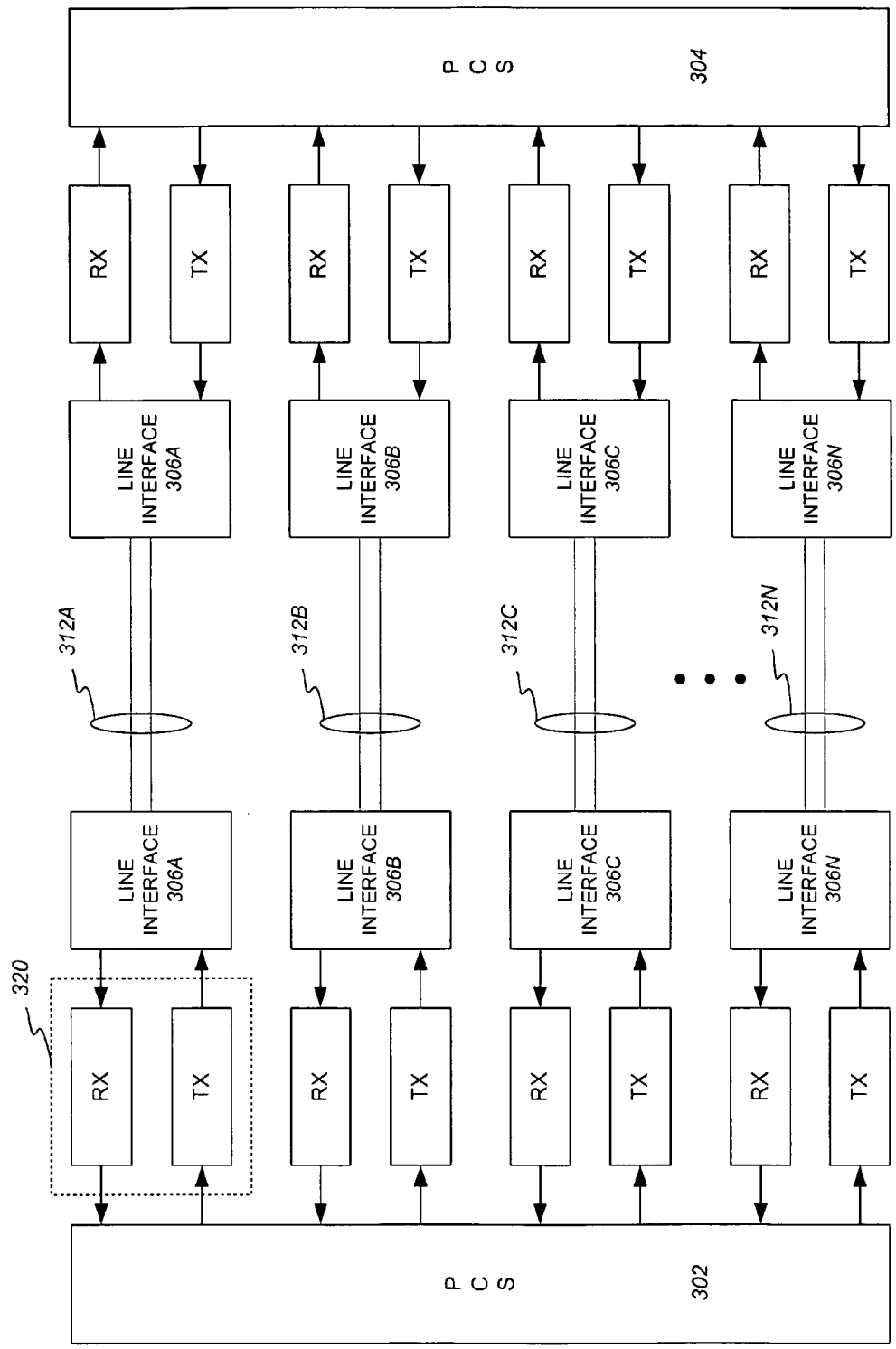
FIG. 1B illustrates a block diagram of a multi-channel point to point communication system.

The communication system illustrated in FIG. 1B is configured as an exemplary multi-channel point-to-point communication system. One exemplary application is a 10 gigabit transceiver utilizing a Category 5 UTP cable supporting Ethernet protocols. As shown it includes a physical coding sublayer 302 and 304, shown as coupled together over a channel 312. In one embodiment each channel comprises twisted pair conductors. Each of the channels 312 is coupled between transceiver blocks 320 through a line interface 306 and each channel is configured to communicate information between transmitter/receiver circuits (transceivers) and the physical coding sublayer (PCS) blocks 302, 304. Any number of channels and associated circuitry may be provided. In one embodiment, the transceivers 320 are capable of full-duplex bi-directional operation. In one embodiment, the transceivers 320 operate at an effective rate of about 2.5 Gigabits per second.

Figure 1C:
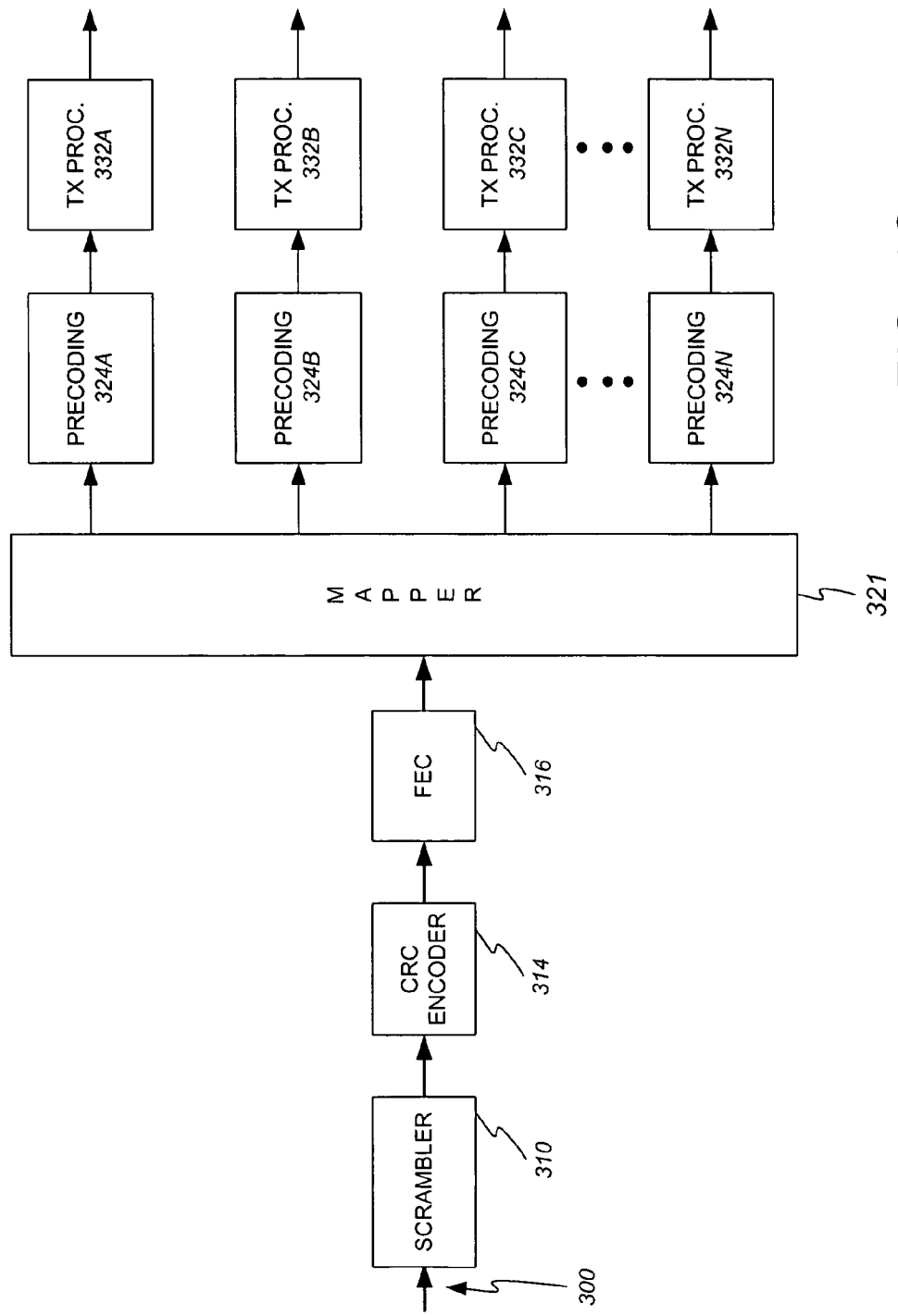
FIG. 1C illustrates a block diagram of an example embodiment of a transmit system configured in accordance with one embodiment of the invention.

FIG. 1C illustrates a block diagram of an example embodiment of a transmit system configured in accordance with the invention. This is but one example embodiment and it is contemplated that one of ordinary skill in the art may enable other embodiments that do not depart from the scope of the invention. As shown, an input 300 from a data source or other component provides data to a scrambler 310. The data source or other component may comprise any source of data, any aspect of the physical coding sublayer, software or hardware interface, multiplexer, or any other device. The input to the scrambler 310 may comprise the output of the multiplexer 34, shown and discussed below in connection with FIG. 1E.

The scrambler 310 operates in a manner understood in the art. The output of the scrambler connects to a CRC encoder 314. The CRC encoder 314 calculates a cyclic redundancy check which is appended to a group of N blocks of encoded data. At the receiver this CRC may be checked to determine if a transmission error has occurred.

The output of the CRC encoder 314 feeds into a FEC unit 316 configured to perform forward error correction on the signal. Any type of forward error correction may occur, including, but not limited to low density parity check (LDPC) coding, such as for example with a 10GBASE-T system, or any other type of forward error correction method including a concatenation of Reed-Solomon (RS) coding with trellis coded modulation (TCM).

In other embodiments the following types of error correction encoding may be performed: trellis coding, convolutional coding, block coding, product coding or any other type of coding.

The output(s) of the FEC unit connect to a mapper 321. It is contemplated that any number of mappers 321 may be provided, up through N where N is any positive integer value. The mapper 321 is configured to transform or map the arriving data into one or more values, such as symbols. In one embodiment the mapping comprises pulse amplitude modulation (PAM). PAM-type mapping assigns incoming groups of bits to a symbol value. In PAM mapping, a symbol comprises a value that represents one or more bits that are transmitted during a transmit opportunity in place of the one or more bits. Mapping of this nature is known by one of ordinary skill in the art and accordingly is not discussed in detail herein. In one embodiment the mapper 321 performs four-dimensional mapping. As a result, in such an embodiment each mapper 321 outputs four symbols during each clock cycle.

The output of the mapper 321 connects to precoding modules 324A-324N. Although in one embodiment the mapper 321 includes four outputs, each of which feed into a precode module 324, it is contemplated that the precoding operations may be distributed among any number of precode modules, up to N modules, where N is a positive whole number. Precoding may comprise any type signal processing that may occur in the transmitter to counter the effects of the channel. In one embodiment the precoding comprises processing by a finite impulse response filter.

The output of the precoders 324A-324N connect to one or more transmit processing systems 332A-332N. Any number of transmit processing systems 332A-332N may be utilized where N is any positive whole number. Transmit processing comprises processing to facilitate transmission of the signal over one or more channels. The transmit processing systems 332A-332N may comprise line interfaces, amplifiers, transformers, filtering, shaping filters, hybrids, digital to analog converters, and the like as may be desired to facilitate transmission of a signal or data to a remote location.

As an advantage to the configuration shown in FIG. 1C, the combined effects of forward error correction, encoding, mapping and precoding are combined to reduce error rates while maximizing transmit rates. In addition, the transmit system of FIG. 1C may include constellation shaping within the mapper 321.

Figure 1D:
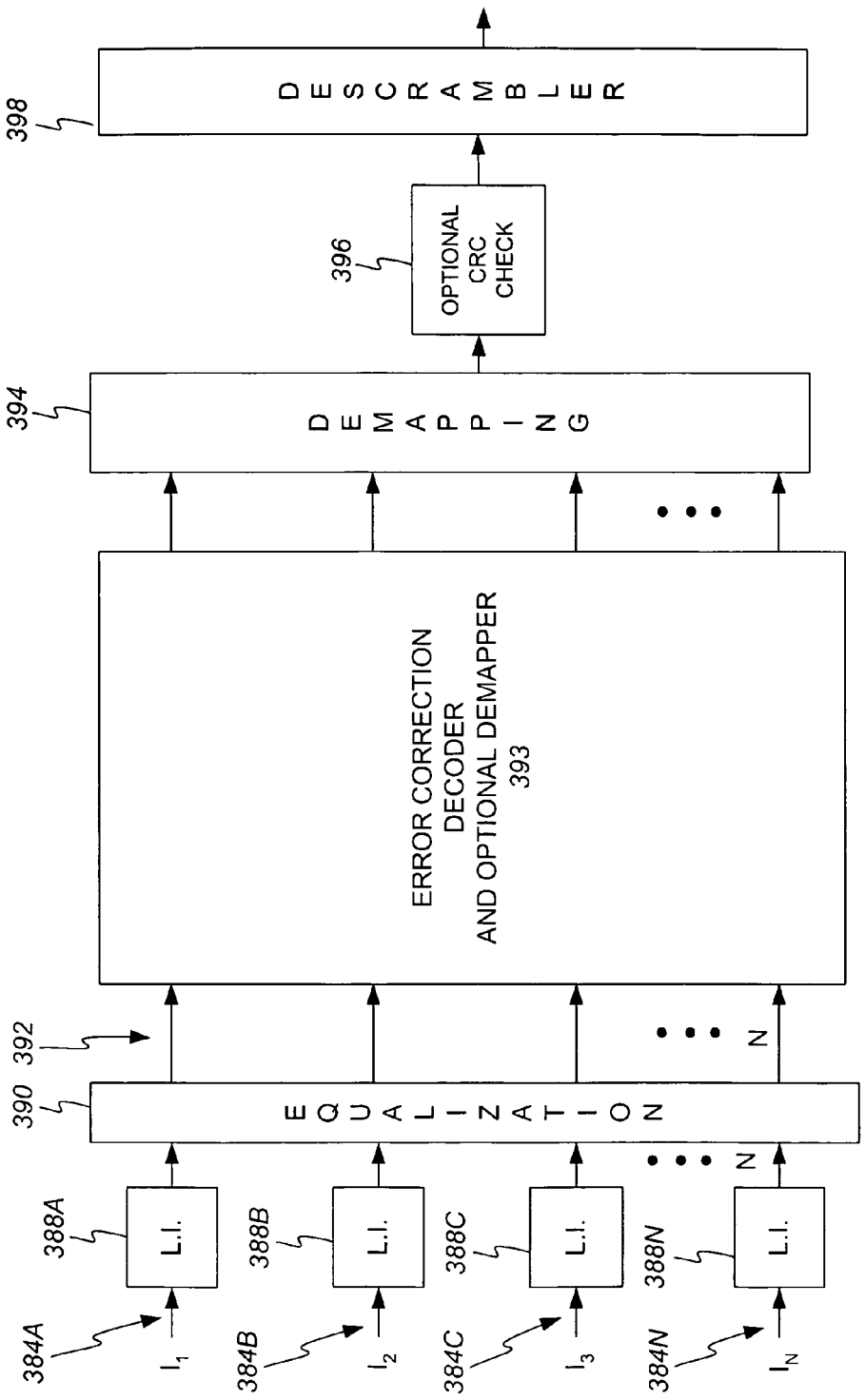
FIG. 1D illustrates a block diagram of an example embodiment of a receiver system configured in accordance with one embodiment of the invention.

FIG. 1D illustrates a block diagram of an example embodiment of a receiver system for use with a transmitter, such as the transmitter shown in FIG. 1C. This is but one example embodiment of a receiver. It is contemplated that one of ordinary skill in the art may design other configurations that differ from the exact configuration shown in FIG. 1D, but are within the scope of the invention and claims that follow. As shown, inputs $I_1$-$I_N$ receive signals from one or more channels 384. Any number of N inputs may exist where N equals any positive whole number. The inputs 384 connect to line interfaces 388A-388N, where N equals any positive whole number. The line interfaces 388A-388N may comprise any configuration of hardware, software or both configured to receive a signal over one or more channels and process the signal to prepare the signal for subsequent processing. In one embodiment a line interface 388 may comprise amplifiers, filters, and hybrids.

The output of the line interfaces 388 connect to an equalizer module 390. The equalizer module 390 comprises hardware, software, or both configured to perform equalization on the received signal. In one configuration the equalization occurs to reduce intersymbol interference. In one configuration the equalizer module comprises a feedforward filter and decision feedback equalizer. Co-pending patent application, entitled Method and Apparatus for Channel Equalization, by inventor William Jones, which was filed on Jul. 1, 2002, and issued as U.S. Pat. No. 6,961,373 is incorporated in its entirety herein and describes an equalization system as is compatible for use with one or more embodiments of the invention. It is contemplated that any equalizer system or other apparatus configured to generate an accurate decision of the transmitted signal may be utilized. It is contemplated that the equalization module 390 may include a slicer or other decision device and be located or distributed at any point in the receiver.

The output of the equalizer 390 feeds into an error correction decoder 393. As discussed above, the decoder 393 reverses the error correction coding. In the module decoder 393 there may exist several decoder sub-modules configured in association. This provides the advantage of distributing the processing burden of the error correction decoding across numerous subsystems. As a result, high-speed channel throughput may be achieved in a realizable architecture. The receiver may be configured with M number of decoders 393 where M is any positive whole number.

It is contemplated that the error correction decoding is matched to that utilized in an associated transmitter. In one embodiment the decoders may be configured to perform continuous trellis decoding. This is in contrast to packet based trellis coding/decoding. As a result, the benefits of continuous trellis decoding are gained. These benefits include but are not limited to a reduction in the total number of symbols that must be sent to fully error correction decode the received signal. In contrast to packet based decoding which requires that additional symbols be sent to terminate the trellis, the continuous trellis decoder embodiment operates on a continuous stream of trellis encoded data and control symbols and does not require that the trellis be terminated at the end of each packet. In other embodiments trellis coding/decoding may be omitted.

The decoder 393 outputs the error corrected signal or data to a demapping system which is configured to reverse the effects of mapping that occurred during the transmit processing. The output of the demapping module 393 connects to an optional CRC check unit 396 which performs as understood in the art. The output of the optional CRC check unit connects to a descrambler 398 to reverse the effects of the scrambler, if utilized and located in the transmitter.

Figure 1E:
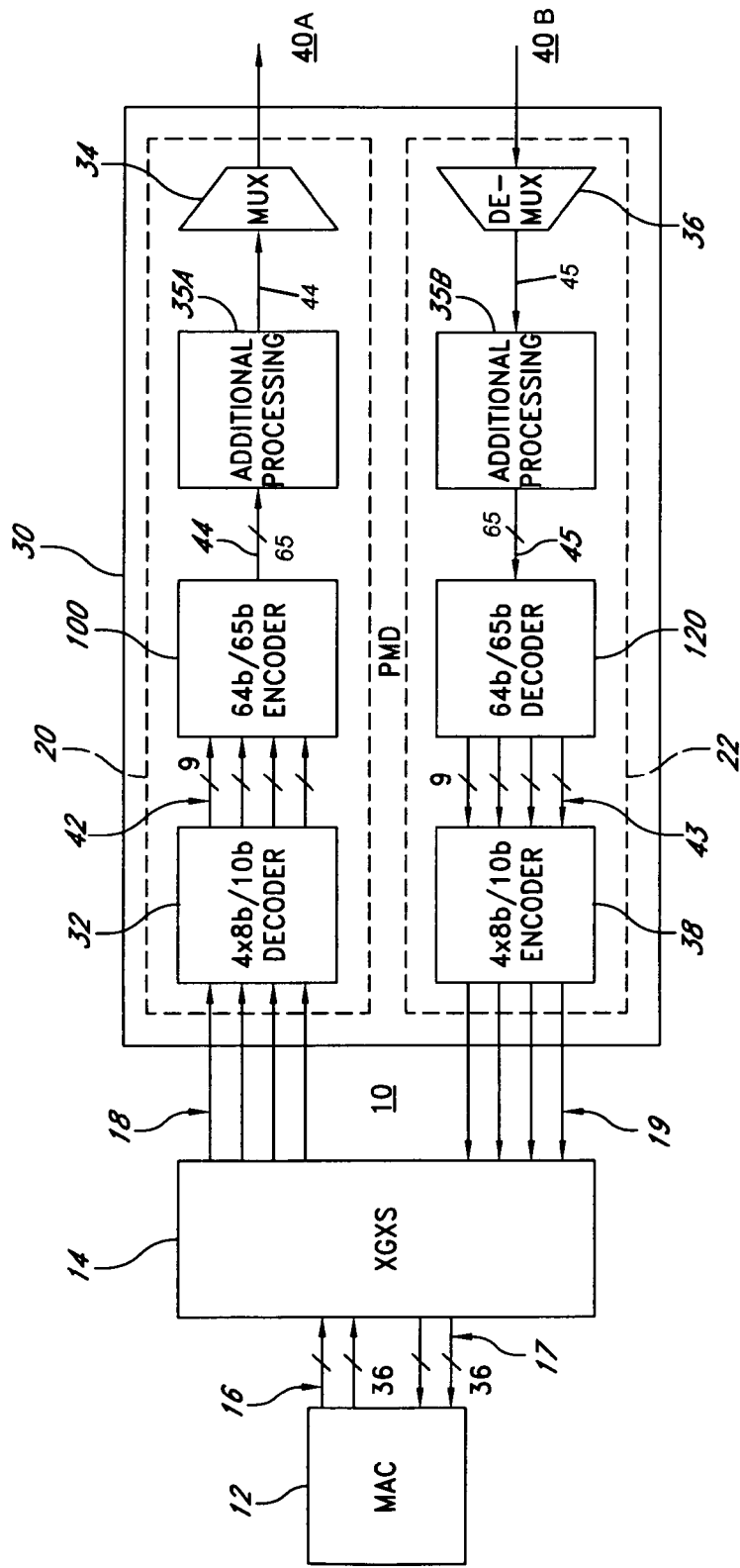
FIG. 1E is a block diagram showing an example of a 10 Gb/s Ethernet interface including a coder according to the invention.

FIG. 1E is a block diagram showing an example of a 10 Gb/s Ethernet interface 10 including the physical coding sublayer module (PCS) 30 that includes the encoder 100 according to the invention. The interface 10 is composed of the medium access controller (MAC) 12, the XGMII Extender Sublayer module (XGXS) 14 and the Physical Coding Sublayer (PCS) 30. The MAC sends data including user data received from the host system (not shown) to the XGXS via the 37-conductor XGMII bus 16. The MAC additionally receives data that include user data from the XGXS 14 via the 37-conductor XGMII bus 17 for supply to the host system.

The XGXS 14 sends a coded serial bitstream, to be described below, to the PCS 30 via the 4-lane XAUI bus 18 and receives a coded serial bitstream from the PCS via the 4-lane XAUI bus 19.

The physical coding sublayer module (PCS) 30 includes the transmission path 20 and the reception path 22. The transmission path 20 is composed of a serial arrangement of the 4×8b/10b decoder 32, the encoder 100 according to the invention, additional processing and the multiplexer 34. The input of the 4×8b/10b decoder is connected to one output of the XGXS 14 by the XAUI bus 18. The output of the 4×8b/10b decoder is connected to the input of the encoder by the 37-conductor pseudo-XGMII bus 42.

The output of the encoder 100 is connected to one or more additional processing elements 35A by the bus 44. In one embodiment, the bus 44 is 65 conductors wide, but the encoder and the multiplexer may be configured to use a bus that is substantially narrower than this. The output of the multiplexer is a serial bitstream that is fed to the Ethernet medium 40A or to other processing elements. For example, the output of the multiplexer 34 may be provided as an input to the scrambler 310 shown in FIG. 1C.

The reception path 22 is composed of a serial arrangement of the demultiplexer 36, the decoder 120 and the 4×8b/10b encoder 38. The demultiplexer receives a serial bitstream from the Ethernet medium 40B. The input of the demultiplexer may be provided from the output of the descrambler 398 shown in FIG. 1D when used with a multi-conductor channel.

The output of the demultiplexer 36 is connected to the input of the decoder 120 by the bus 45. In one embodiment, the bus 45 is 65 conductors wide, but the demultiplexer and the decoder may be configured to use a bus substantially narrower than this. The output of the decoder is connected to the input of the 4.times.8b/10b encoder by the 37-conductor pseudo-XGMII bus 43. The output of the 4×8b/10b encoder is connected to one input of the XGXS 14 by the XAUI bus 19. An optional processing element 35B may be included in the path as shown, and may comprise any type of processing. Element 35B may be omitted in certain embodiments.

In the Ethernet interface 10, the MAC 12 receives user data from, and provides user data to, a host system (not shown). The MAC takes any number of words of user data between 64 and 1500, adds 22 words of address and other data to the front of the user data and four words of a CRC-32 checksum to the end of the user data to form a packet. In this disclosure, the contents of a packet will be called information words.

The MAC additionally generates a Start of Packet (SOP) control word S that it adds to the start of each packet to mark the start of the packet. The MAC additionally generates an End of Packet (EOP) control word T that it adds to the end of each packet to mark the end of the packet. The MAC also generates additional control words and inserts them between consecutive packets to generate a continuous stream of words for transmission to the XGXS 14. The continuous stream is required to maintain receiver phase alignment. The additional control words include Idle I, Comma K, Skip R, Align A and Error E. This disclosure uses the letter Z as a generic term to indicate any one of the control words.

The MAC 12 feeds the continuous stream of words to the XGXS 14 via the XGMII bus 16. Of the 37 conductors in each of the XGMII buses 16 and 17, 32 are allocated to four, parallel, eight-bit words; four are allocated to control word flags, each of which indicates whether a respective one of the four words is an information word or a control word; and one is allocated to a clock signal. A set of four eight-bit words transported in parallel by the XGMII busses 16 and 17 and by the pseudo-XGMII busses 42 and 43 will be referred to as a quad.

In addition, the MAC 12 receives from the XGXS 14 via the XGMII bus 17 a continuous stream of quads. The quads are composed of information words arranged in packets and code words interspersed between consecutive packets, as just described. The start and end of each packet are marked with an SOP and an EOP control word, respectively. The MAC extracts the packet of information words from the stream of quads received from the XGXS using the control word flags received in parallel with the quads to indicate the information words. The MAC also checks the validity of each packet using the CRC-32 checksum that constitutes the last four words of the packet. The MAC then extracts the user data from the packet, and forwards the user data to the host system (not shown).

The XGXS 14 receives the continuous stream of quads from the MAC 12. The MAC and the XGXS are elements of conventional Ethernet system. Consequently, the XGXS module applies 8b/10b line code to each word in the quads received from the MAC. Each word is coded in response to its respective control word flag so that information words and control words having the same eight-bit code are represented by different ten-bit codes. The XGXS also serializes the 10-bit line code words and feeds them to the input of the PCS 30 via the XAUI bus 18. The XAUI bus is standardized for 10 Gb/s Ethernet and is composed of four parallel conductors, called lanes, each of which carries serial 10-bit line code words at a bit rate of 3.125 Gb/s. Thus, the four conductors constituting the XAUI bus collectively transfer the serial 10-bit line code words to the PCS 30 at an effective bit rate of 12.5 Gb/s.

The XAUI busses 18 and 19 use four parallel conductors to achieve a total bit rate of 12.5 Gb/s.

The XGXS 14 also receives four serial bitstreams from the PCS 30 via the XAUI bus 19. The XGXS parallelizes the bitstreams, decodes the 8b/10b coding of the 10-bit line code words constituting the bitstream, and feeds the resulting continuous stream of quads composed of information words and control words to the MAC 12 via the XGMII bus 17. The XGXS additionally feeds a control word flag for each of the words constituting the quads to the MAC via the XGMII bus.

In the transmission path 20 of the PCS 30, the 4.times.8b/10b decoder 32 is connected to the XAUI bus 18 to receive incoming serial 10-bit line code words at a bit rate of 4.times.3.125 Gb/s. The 4.times.8b/10b decoder decodes the 8b/10b coding of the 10-bit line code words to recover respective 8-bit words, and generates, for each word, a word type bit that indicates whether the word is an information word or a control word. The 4.times.8b/10b decoder feeds quads of the 8-bit words and their respective control word flags to the encoder 100 via the pseudo-XGMII bus 42. The pseudo-XGMII bus has the same structure as the XGMII bus 16, but is called pseudo-XGMII in this disclosure to indicate that this bus does not form part of the 10 Gb/s Ethernet standard. The pseudo-XGMII bus is composed of 37 conductors. Thirty-two of the conductors are allocated to the quads, four of the conductors are allocated to the control word flags for the quads, and one conductor is allocated to a clock signal.

It might appear that a substantial simplification could be achieve by omitting the XGXS 14, the XAUI busses 18 and 19, the 4.times.8b/10b decoder 32 the 4×8b/10b encoder 38 and the pseudo-XGMII busses 42 and 42, and simply connecting the encoder 100 and the decoder 120 to the MAC 12 via the XGMII busses 16 and 17. However, the maximum transmission distance of current embodiments of the XGMII bus is of the order of 100 mm, whereas that of the XAUI bus is of the order of 1 m. Thus, the above-described simplification can be made if the length of the XGMB bus is less than the maximum transmission distance of such bus.

The encoder 100 receives the quads from the pseudo-XGMII bus 42 as input data, encodes consecutive pairs of the quads to generate respective 65-bit packets, as will be described in more detail below, and feeds the packets to one or more additional processing elements 35A as shown herein and which are shown generally as additional processing elements 35A. The additional processing elements may comprise, but are not limited to any type additional processing. Alternatively, this processing element 35A may be left out of the system if no such additional processing is desired.

The output of the additional processing elements 35A feeds into the multiplexer 34 via the bus 44A. The multiplexer 34 receives the 65-bit packets, serializes them and transmits them to the Ethernet medium 40A at a bit rate of 10 Gb/s. The output of the multiplexer 34 may feed as the input 300 into the scrambler 310 for transmission over a multi-conductor channel. In the reception path 22 of the PCS 30, the demultiplexer separates the serial data received at a bit rate of 10 Gb/s from the Ethernet medium 40B into 65-bit packets, and feeds through additional and optional processing elements 35B and then to the decoder 120 via the bus 45. The decoder decodes the 65-bit packets to generate two consecutive quads of eight-bit words and a control word flag for each word. The decoder transfers the quads and their respective control word flags in parallel to the 4×8b/10b encoder 38 via the pseudo-XGMII bus 43.

The 4×8b/10b encoder 38 applies 8b/10b encoding to the quads received via the pseudo-XGMII bus 43, operating in response to the control word flag for each word constituting the quads. The 4.times.8b/10b encoder transfers the resulting 10-bit line code words via the XAUI bus 19 to the XGXS module 14 at a bit rate of 12.5 Gb/s. The 10-bit line code words are processed by the XGXS and the MAC 12 to provide the received user data to the host system (not shown), as described above.

It should be noted that the XGXS 14 and corresponding 8b10b encoder 38, and decoder 32 may be optional and hence, embodiment may be enabled without these elements. In such an embodiment the XGMII interface 16 and 17 can be connected directly to the 64b/65b encoder 100 and decoder 120. Or, in one embodiment the XGMII interface may be configured to extend over long PCB distances by using the XGMII Extender sublayer as shown.

The 64b/65b coding applied by the encoder 100 according to the invention will now be described with reference to FIGS. 2, 3A-3D and 4A-4C.

Figures 2, 3A, 3B, 3C, 3D:
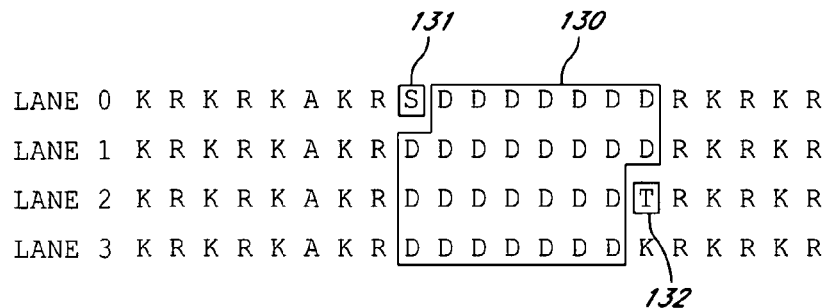
FIG. 2 schematically shows exemplary quads of the input data received by the coder according to the invention.
FIGS. 3A-3D show the twelve possible types of blocks that can be received by the coder according to the invention.

FIG. 2 schematically shows exemplary quads of the input data received by the encoder 100 via the four lanes of the pseudo-XGMII bus 42. The input data include the exemplary packet 130 composed of information words D. To simplify the drawing, the number of information words in the packet 130 is substantially fewer than the minimum number of information words in a standard Ethernet packet.

Prior to the start of the packet 130, the encoder 100 receives control words on all four input lanes of the pseudo-XGMII bus 42. The control words in the four lanes denote an inter-packet gap. A set of alignment characters A that can be used to synchronize the lanes is also shown. The start of the packet 130 is indicated by the SOP control word S, shown at 131. The SOP control word always appears in lane 0 and never appears in any other lane. If the SOP control word appears in a lane other than lane 0, this indicates an error and the packet is filled with error codes E.

The information words D constituting the packet 130 are then consecutively received, followed by the EOP control word T, shown at 132. The EOP control word can appear in any of the lanes of the pseudo-XGMII bus 42. The lane in which the EOP control word appears depends on the number of information words in the packet. The packet can be composed of any number of information words between 64 and 1500. The minimum number of control words between consecutive packets is 12. Following the EOP control word 131, the encoder 100 receives control words that denote an inter-packet gap via all four lanes of the pseudo-XGMII bus. The control words continue until the SOP control word (not shown) indicating the start of the next packet.

The encoder 100 according to the invention applies 64b/65b encoding to blocks composed of two quads of the input data consecutively received from the pseudo-XGMII bus 42, i.e., the 64b/65b coding is applied to a total of 64 received bits. Thus, the 64b/65b coding uses 65 bits to represent the 64 received bits. The 64b/65b coding adds a block header composed of one bits to the start of the block to form a frame. Use of a single bit for the block header has numerous advantages, which are discussed below in more detail. The block header serves both as a reference for frame synchronization and as a flag that indicates when the frame is composed exclusively of information words. The 64b/65b coding has a coding efficiency of 64/65, or an overhead of 1.5625%, which is an advantage over prior art encoding schemes. Since each word received from the pseudo-XGMII bus 42 can be either a control word or an information word, as indicated by the word's respective control word flag, also received from the pseudo-XGMII bus, a fully-general code would need to transmit the control word flag for each word to tell the receiver what type of word is being received. The maximum efficiency of such a code would be 8/9, or a 12.5% overhead. The 64b/65b coding achieves a substantially lower overhead than this by taking advantage of features of the XAUI interface and the Ethernet packet structure that reduce the number of possible ways in which information words and control words can be arranged in the input data.

First, each packet of information words received by the encoder 100 is composed of at least 64 words, always starts with the SOP control word S and always ends with the EOP control word T, and consecutive packets are separated by at least 12 control words. This means that when blocks of eight words (64 bits) of the input data are coded, each block can contain information words exclusively, control words exclusively, a single transition from control words to information words or a single transition from information words to control words. As noted above, the block header that constitutes the first bit of the frame operates as a flag to indicate when the frame is composed exclusively of information words. This means that, instead of including eight control word flags in each frame to indicate whether the eight words constituting the frame are each an information word or a control word, this number of bits can be used to represent a TYPE word that is included in all frames that are not composed exclusively of information words. Different values of the TYPE word indicate one of the following structural properties of the block: 1) whether the block from which the frame is derived is composed exclusively of control words, 2) the position of the start of a packet in the block from which the frame was derived and 3) the position of the end of a packet in the block from which the frame was derived. Since the number of states represented by the eight-bit TYPE word is relatively small, TYPE words having a large mutual Hamming distance can be chosen. For example, the TYPE words can be chosen so that more than three bit errors are required to convert one TYPE word to another.

Second, as noted above, XAUI semantics guarantee that the SOP control word S appears in lane 0 exclusively. This reduces the number of ways in which the packet start can appear in the frame to two, which further reduces the total number of ways in which the start of the packet or the end of the packet can appear in the frame.

Third, the set of control words is sufficiently small (I, K, R, S, T, A, E, . . . ) to allow the control words to be coded using fewer than eight bits, and to be coded by a set of codes having a large mutual Hamming distance. The bits saved by coding the control words using fewer than eight bits can then be used to condense the block to enable the frame to accommodate the above-described TYPE word. The codes are chosen to enable the control word coding to be highly resistant to bit errors.

FIGS. 3A-3D show the twelve possible types of blocks that the encoder 100 can receive from the pseudo-XGMII bus 42. FIG. 3A shows a block generated from two consecutive quads located in the middle of the packet, where both quads consist exclusively of information words. The block composed of two consecutive quads of exclusively information words is called a Type 1 block.

FIG. 3B shows the one block Type that includes two consecutive quads located in the middle of the gap between two consecutive packets, where both quads consist exclusively of control words. The block composed of two consecutive quads of exclusively information words is called a Type 2 block.

FIG. 3C shows the two different block Types in which the start of the packet appears. The start of the packet is indicated by SOP control word S. Because the SOP control word can only appear in lane 0 of the pseudo-XGMII bus, the SOP control word can appear in only two possible locations in the block. The block in which the SOP control word appears in the even-numbered quad is called a Type 3 block, and that in which the SOP control word appears in the odd-numbered quad is called a Type 4 block.

FIG. 3D shows the eight different block Types in which the end of the packet appears. The end of the packet is indicated by the EOP control word T. Because the EOP control word can appear in any one of the four lanes of the pseudo-XGMII bus, the EOP control word can appear in any location in the block. The blocks in which the EOP control word appears as word 1 through 8 of the block (see FIG. 7A) are called Type 5 through Type 12 blocks, respectively.

The 12 different types of blocks are indicated by a code that uses a combination of the 1 bit block header and the TYPE word. The 12 types of blocks are divided into two different categories, namely, blocks composed exclusively of information words, i.e., the Type 1 block shown in FIG. 3A, and blocks that include at least one control word, i.e., the Type 2-12 blocks shown in FIGS. 3B-3D.

As described herein and in U.S. Pat. No. 6,718,491, and adopted in the IEEE 802.3 (Ethernet) Standard Clause 49, the 10GBASE-R physical layer device utilizes a coding technique to reduce the control bit overhead from 12.5% down to 3.125%, a 4× reduction. This 64B/66B code is essentially a simple compression algorithm using a lookup table based on the contents of the current 8 bytes plus the associated 8 control bits. In this manner 72 bits (64 data bits+8 control bits) are mapped into a 66-bit code word. This code word is then transmitted serial through a fiber optic system to a remote unit that will decode the 66-bit code word back into the original 72 bits using the reverse lookup table. In this way the additional overhead required by the control bits increases the serial bit stream through the fiber optic system to be 10.3125 Gigabit per second. U.S. Pat. Nos. 6,718,491 and 6,650,638 are hereby incorporated herein, in their entirety, by reference.

In one example embodiment 64B/66B encoding is used in a 4 pair UTP transmission system. The use of the 64B/66B encoding reduces the needed bit rate of the proposed system from 11.25 Gbit/sec to 10.3125 Gbit/sec. Following the 64B/66B encoder, an additional Forward Error Correction (FEC) code may optionally be used that adds additional overhead.

In a multi-gigabit transmission system for 4-pair UTP, it may be advantageous to use a more powerful FEC than a TCM solution. Examples of such an FEC include Turbo-Coding, Low-Density Parity Check (LDPC) coding and the concatenation of two or more codes such as TCM and Reed-Solomon codes. In a system such as this it may not be possible or desirable to use extra constellation points to transmit control symbols.

Therefore it may be desirable to reduce the overhead used to transmit Ethernet control bits to the minimum required to accurately reproduce the bit stream at the remote end.

The 64B/66B encoder described in IEEE 802.3 (Ethernet) Standard Clause 49 is intended for a 10.3 Gbit/sec serial bit stream in fiber optic transmission system. This system does not employ a FEC and as such requires a robust mechanism to distinguish between a 66B code block containing control words and a code block that does not. This was accomplished by using a 2-bit sync header prepended to the 64-bit payload. The header takes only 2 possible values: 01 for a data only payload, and 10 for a payload containing control symbols.

This invention proposes to use the 64B/66B encoder as described herein. In one example embodiment, a multi-gigabit 4 pair UTP transceiver is configured with a single bit header. With a one bit header, for example the value '01' is replaced by '0' and '10' is replaced by '1'. The effective encoder rate is 65/64 rather than 66/64 with a one bit header. The IEEE 802.3 (Ethernet) Standard Clause 49 is hereby incorporated by reference.

The system described in U.S. Pat. No. 6,718,491 utilizes a two bit header and a two bit header is necessary for operation of such a system because first it maintains a balance of 1's and 0's necessary for a balanced line code in a bit serial transmission system, second it guarantees a transition of 1 to 0 or from 0 to 1 for the purposes of clock recovery and third it provides redundancy such that more than one bit of the block header must be in error to incorrectly decode the block. Use of the one bit header, as described herein, would not operate in a desirable manner because a single bit error can result in the improper decoding of a block.

In a system using powerful FEC, there is little or no advantage to using a 2-bit header instead of a 1-bit header. The header was designed to provide protection from low-probability independent errors. In the case where a powerful FEC is used, a single error event will corrupt a large block of data bits. Therefore the extra bit is just as likely to be in error and provides no protection. The two bit header however, undesirably increases the number of bits which must be processed and transmitted thereby increasing overhead. This can lead to a increased bit error rate or may result in a lower effective data rate. For example, in the embodiment described herein the required overhead can be reduced from 3.125% to 1.5625% if only 1-bit is used in the sync header. A scrambler placed after the encoder sufficiently balances the line code and provides for data transitions for clock recovery.

One benefit of this invention is that the reduction in overhead makes it possible, in one embodiment, to concatenate the 64B/65B code, a Reed-Solomon (255,239) code and a TCM code using 1-bit of parity per symbol using 12PAM modulation at a baud rate of around 833 Mbaud/sec. For example the original 11.25 Gbit/sec bit stream is encoded using 64B/66B into a 10.3125 Gbit/sec bit stream. After dropping a sync bit the bit stream is 10.15625 Gbit/sec. After RS encoding, the bit stream is. 10.8362 Gbit/sec. Grouping the bits into 13-bit symbols yields an 833.55 Mbaud/sec rate. A TCM code adds a single bit per baud for 14-bits per symbol at 833.55 Mbaud/sec. The 14-bit symbol is mapped into $2^{14}=16{,}384$ constellation points of a 4D-12PAM constellation containing $12^{4}=20{,}736$ points. The unused constellation points may be chosen such that the constellation has a lower transmit power with an associated shaping gain.

Figure 4A:
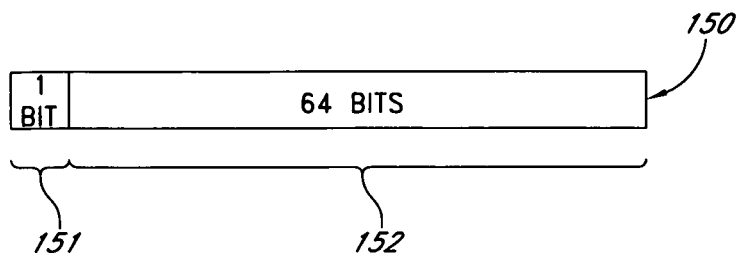
FIGS. 4A-4C show the basic structure and the two kinds of frame that the coder generates from a block of input data.

FIG. 4A shows the basic structure of the frame 150 that the encoder 100 generates from a block of input data. The frame is composed of a one bit sync. field 151 followed by the 64-bit payload field 152. The sync. field accommodates the one bit block header.

The encoder 100 generates two different kinds of frame having the basic structure shown in FIG. 4A, but differing in the structure of their payload fields. The structure of the payload field depends on whether or not the block from which the frame is generated is a Type 1 block composed exclusively of information words. The structure of the payload field is indicated by the 1 bit block header stored in the sync. field.

Figure 4B:
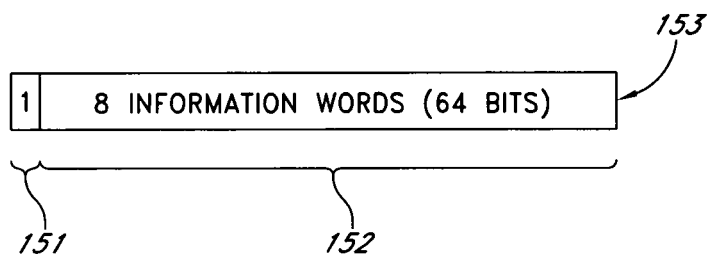

FIG. 4B shows the structure of the frame 153 generated when the block is a Type 1 block. In this, the 1 bit block header in the sync field 151 is '1', and the payload field 152 is composed of the eight information words constituting the block, i.e., 64 bits.

Figure 4C:
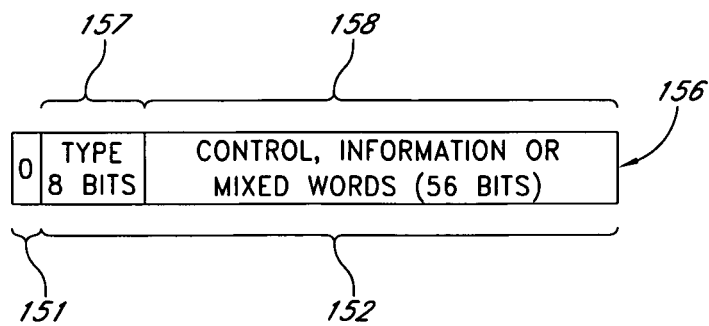

FIG. 4C shows the structure of the frame 156 generated when the block is a Type 2 through Type 12 block that includes at least one control word. In this, the one bit block header in the sync. field 151 is '0', and the payload field 152 is composed of the 8-bit sub-field 157 and the 56-bit sub-field 158. The eight-bit sub-field 157 is occupied by the TYPE word and the 56-bit sub-field 158 is occupied by a condensed version of the block. In particular, all information words included in the block are included unchanged in the sub-field 158. The 56-bit sub-field 158 can accommodate up to seven information words, the maximum number of information words in a block that includes at least one control word. Moreover, the control words S and T, if they appear in the block, are discarded and are not transferred to the sub-field 158. Finally, all remaining control words in the block are re-coded using fewer than eight bits and the re-coded control words are included in the sub-field 158. In the preferred embodiment, the remaining control words are re-coded using seven-bit codes chosen to have a mutual Hamming distance of four bits.

The control words S and T can be omitted from the sub-field 158 because position of the start of the packet or the end of the packet in the frame is indicated by the TYPE word included in the sub-field 157. Omitting the control words S and T allows the payload field 158 to accommodate the TYPE word and all seven information words in full when the block is composed of seven information words and either the SOP control word S or the EOP control word T, as in the Type 3 block shown in FIG. 3C and the Type 12 block shown in FIG. 3D. Re-coding the remaining control words as 7-bit words enables the payload field 158 to accommodate the TYPE word and all eight control words when the block is composed exclusively of control words, as in the Type 2 block shown in FIG. 3B. All other combinations of information words and control words are composed of fewer than 56 bits after the S and T control words have been removed and the remaining control words have been re-coded using fewer bits.

Figure 5:
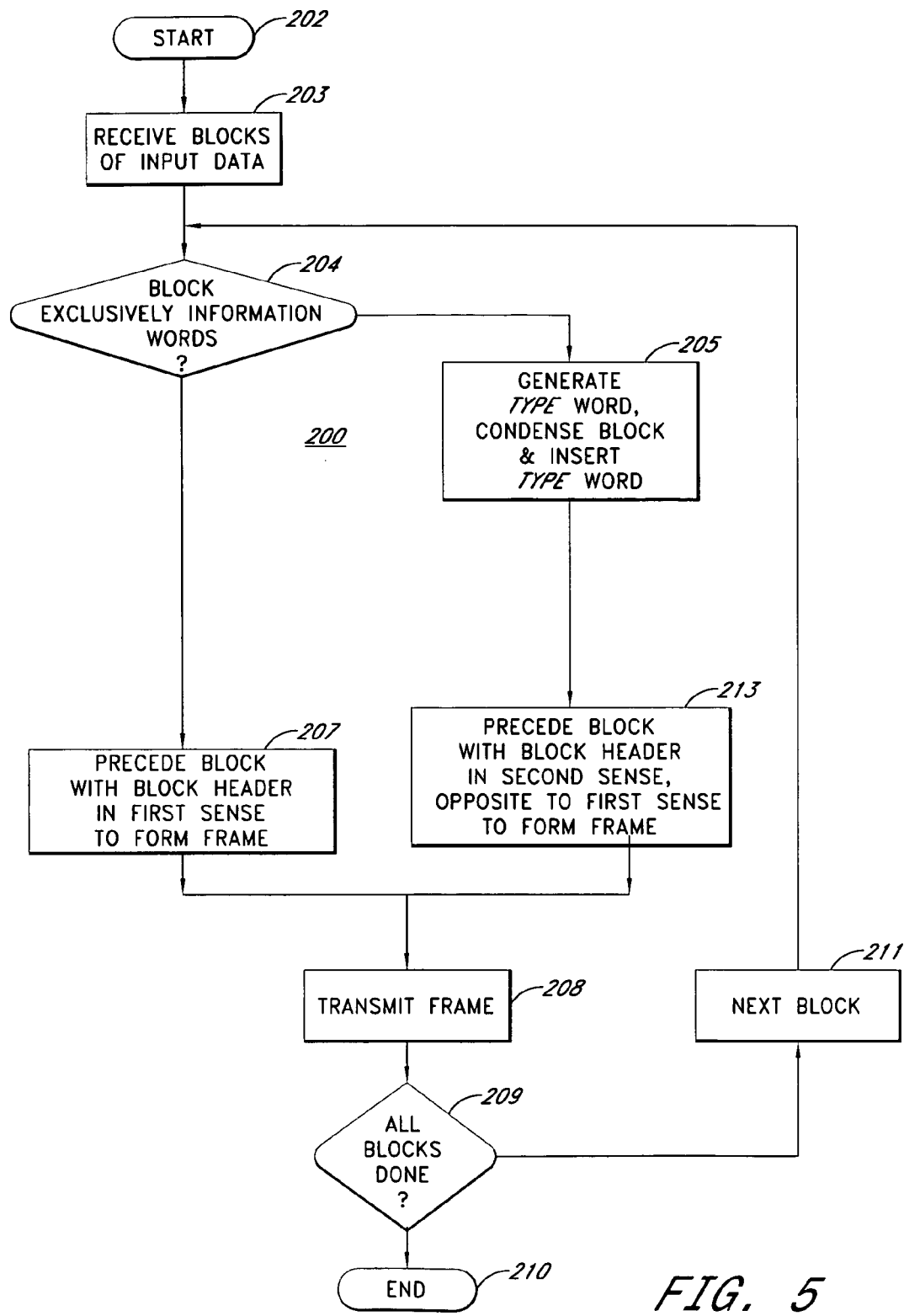
FIG. 5 is a flow chart showing a first embodiment of a coding method according to the invention.

FIG. 5 is a flow chart showing a first embodiment 200 of a method according to the invention for applying 64b/65b coding to input data that include a packet of information data. The processing performed in process 205 of the method will be described in more detail below with reference to FIG. 6.

The method starts at process 202. In process 203, blocks of the input data are received. The input data include the above-mentioned control words in addition to the packet of information words. The control words precede and follow the packet of information words. The blocks are smaller than the packet. In the preferred embodiment, each block is composed of two successive quads of four parallel words received from the pseudo-XGMII bus 42.

In process 204, a test is performed on a block of the input data to determine whether the block is composed exclusively of information words. In the preferred embodiment, this test can be performed simply by examining the control word flags for the eight words that constitute the block. The control word flags are received together with the words that constitute the block via the pseudo-XGMII bus 42.

When the test result is NO, execution advances to process 205, which will be described below. When the test result is YES, execution advances to process 207 wherein a frame is formed by preceding the block with a one bit block header in the first sense. In the preferred embodiment, the one bit block header in the first sense is provided by the bit '1'.

Execution then advances to process 208, where the frame is transmitted, and to process 209, where a test is performed to determine whether all the blocks of the input data have been processed. When the test result is YES, execution advance to process 210, where it ends. When the test result is NO, execution returns to process 204 via process 211 so that the next block can be processed.

When the test result in process 204 is NO, this indicates that the block includes at least one control word. Execution advances to process 205, where a TYPE word that identifies the structural properties of the block is generated, the block is condensed and the TYPE word is inserted into the block. The TYPE word indicates one of the following structural properties of the block: 1) whether the block is composed exclusively of control words, 2) the position in the block of the start of the frame and 3) the position of the end of the frame the block. Block Types are described in detail above with reference to FIGS. 3A-3D. The processing performed in process 205 will be described in more detail below with reference to FIG. 6.

Execution then advances to process 213, where a frame is formed by preceding the block with a one bit block header in a second sense, opposite to the first sense. In the preferred embodiment, the block header in the second sense is provided by the one bit '0'.

Execution then advances to process 208, where the frame is transmitted, as described above.

Figure 6:
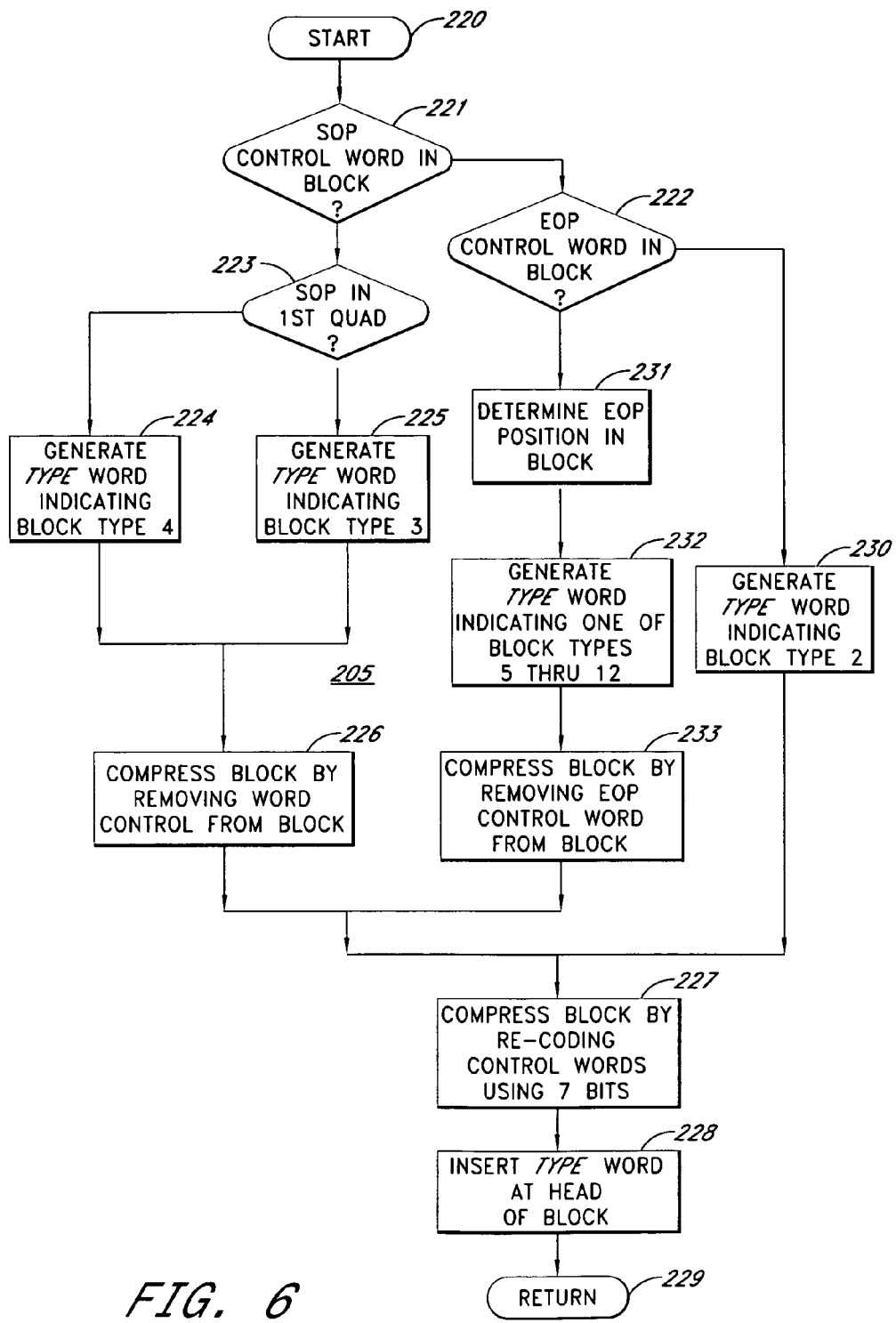
FIG. 6 is a flow chart showing an example of the processing performed in process 205 of the method shown in FIG. 5.

FIG. 6 shows an example of the processing performed in process 205. In this process, the block is condensed and a TYPE word indicating the structural properties of the block is inserted into the block. The structure includes the position of the start or the end of the packet in the block, and whether the block is composed exclusively of control words.

Execution starts in process 220. In process 221, a test is performed to determine whether the block includes the SOP control word S that indicates that the packet starts in the block. When the test result is NO, execution advances to process 222, which will be described below. When the test result is YES, execution advances to process 223, where a test is performed to determine whether the SOP control word appears in the first quad constituting the block. Each block processed by the encoder 100 is composed of two consecutively-received quads.

When the test result generated by process 223 is NO, execution advances to process 224, where a TYPE word indicating that the block is a Type 4 block is generated. A Type 4 block is one in which the SOP control word appears in the second quad. Block types are described in detail above with reference to FIGS. 3A-3D. Execution then advances to process 226, which will be described below. When the test result generated in process 223 is YES, execution advances to process 225, where a TYPE word indicating that the block is a Type 3 block is generated. A Type 3 block is one in which the SOP control word appears in the first quad.

Execution advances from process 224 or process 225 to process 226, where the block is condensed by removing the SOP control word from the block. Condensing the block creates space in the block for the TYPE word generated in process 224 or process 225 to be inserted into the block in process 228, to be described below.

Execution then advances to process 227, where the block is condensed by re-coding any control words in the block using fewer bits. If either process 226 or process 233 has previously been executed, the effect of executing process 227 is to compress the block further. Process 233 will be described below. The purpose of condensing the block is described above. In the preferred embodiment, the 8-bit control words are re-coded using fewer bits. The set of control words is sufficiently small to allow the control words to be coded using 7-bit codes chosen to have a mutual Hamming distance of four bits. The re-coding process can refer to the TYPE word for the block to find the locations of the control words in the block.

Execution then advances to process 228, where the TYPE word is inserted at the head of the block. Space to accommodate the TYPE word has been created in the block by executing one or more of processes 226, 227 and 233. Process 233 is described below. Execution then advances to process 229, whence it returns to the main routine.

When the test result in process 221 is NO, execution advances to process 222, where a test is performed to determine whether the block includes the EOP control word T that indicates that the end of the packet appears in the block. When the test result is NO, execution advances to process 230, which will be described below. When the test result is YES, execution advances to process 231, where the position of the EOP control word in the block is determined. As shown in FIG. 3D, any of the eight words in the block can be the EOP control word.

Execution then advances to process 232, where a TYPE word is generated in accordance with the position of the EOP control word in the block. The TYPE word indicates that the block is one of a Type 5 through Type 12 block. Type 5 through Type 12 blocks are blocks in which the EOP control word appears in one of the eight word positions in the block, as described above with reference to FIG. 3D.

Execution then advances to process 233, where the block is condensed by removing the EOP control word from the block. The purpose of condensing the block is described above.

Execution then advances to process 227, where the block is further condensed by re-coding any control words remaining in the block are re-coded using fewer bits, as described above.

A test result of NO in process 222 indicates that the block is composed exclusively of control words. In this case, execution advances to process 230 where a TYPE word indicating that the block is a Type 2 block is generated. A Type 2 block is a block composed exclusively of control words.

Execution then advances to process 227, where the block is condensed by re-coding the control words included in the block using fewer bits, as described above. In this case, all eight words in the block are control words and are re-coded.

Note that in the above processing, such information words as are included in the block remain unchanged.

Figure 7A:
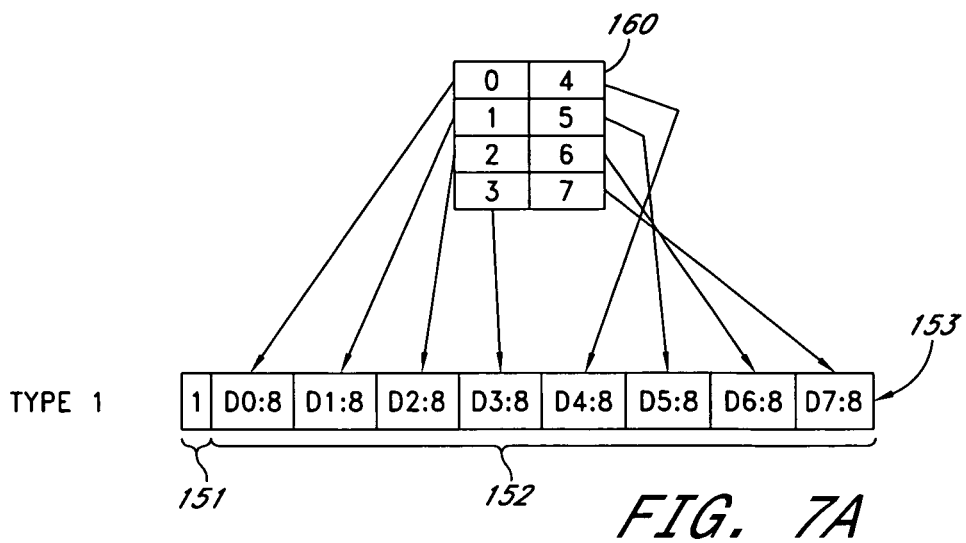

FIGS. 7A-7L show specific examples of the frames generated from each of the twelve block types shown in FIGS. 3A-3D, including the block header and the TYPE word, where used. FIG. 7A shows the frame 153 generated from the Type 1 block shown in FIG. 3A. This block is composed exclusively of information words. In the frame 153, the sync field 151 is filled with the one bit block header '1' and the payload field 152 is filled with the eight information words located in the eight positions 0 through 7 in the block 160, as shown. Each of the information words in the payload field is labeled with the letter D, a number and the numeral 8. The letter D indicates an information word, the number indicates the location of the information word in the block 162 and the numeral 8 indicates that the information word is composed of eight bits.

Figure 7B:
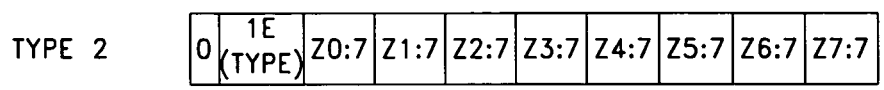
Figure 7C:
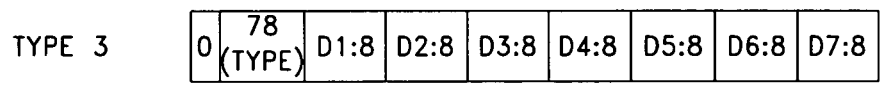
Figure 7D:
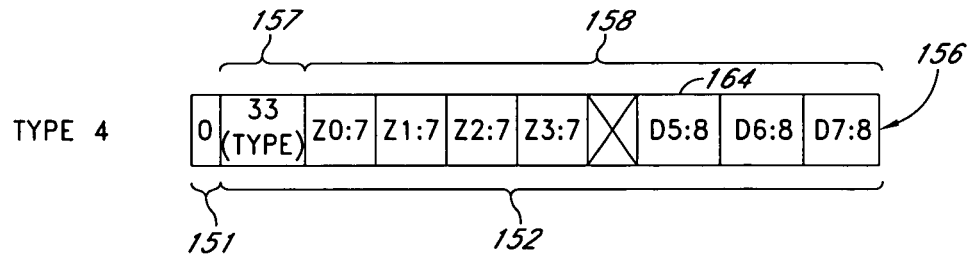
Figure 7E:
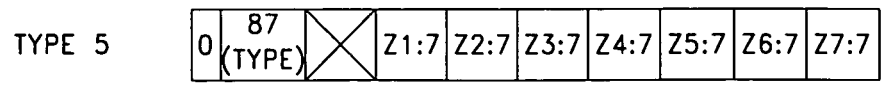
Figure 7F:
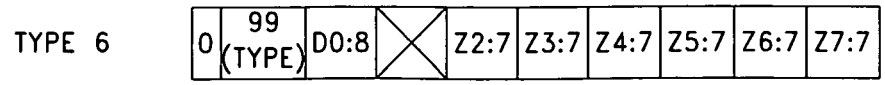

FIG. 7B shows a frame generated from the Type 2 block shown in FIG. 3B. FIGS. 7C and 7D respectively show frames generated from the Type 3 and Type 4 blocks shown in FIG. 3C. FIGS. 7E-7L respectively show frames generated from the Type 5 through 12 blocks shown in FIG. 3D. As an example, FIG. 7D shows the frame 156 generated from the Type 4 block shown in FIG. 3C. The Type 4 block is composed partly of control words, i.e., the SOP control word S and the unspecified control words Z, and partly of information words D. In the frame 156, the sync. field 151 is occupied by the one bit block header '0' and, in the payload field 152, the sub-field 157 is occupied by the 8-bit TYPE word, in this example, the hexadecimal number 33.sub.H. The TYPE word indicates that the frame is generated from a Type 4 block in which the start of a packet appears in the odd-numbered quad constituting the block. The sub-field 158 of the payload field is occupied by three coded control words Z and three eight-bit information words D.

Each of the data elements in the sub-field 158 is labeled with the letter D or Z, a number and the numeral 7 or 8. The letter D indicates an information word, the letter Z indicates a control word, the number indicates the location of the information word or control word in the block using the convention described above with reference to FIG. 7A, the numeral 7 or 8 indicates the number of bits in the data element, i.e., seven bits for each coded control word and eight bits for each information word. As noted above, the SOP control word S is discarded and is not transferred to the sub-field 158. The function of the SOP control word indicating that the packet starts at position 4 of the block is provided by the TYPE code 33.sub.H instead.

The three coded control words Z coded as 7-bit words and three eight-bit information words D do not fully occupy the sub-field 158 of the frame 156. The unoccupied region 164 of the sub-field is filled with suitable idle bits. Alternatively, functions can be assigned to the bits used to fill the unoccupied portions of the sub-field 158.

The TYPE words illustrated in FIGS. 7B-7L are chosen to have a mutual Hamming distance of four bits to ensure that the start and the end of the packet are reliably identified. The TYPE words are additionally chosen to be easy to generate and to test. The set of chosen TYPE words is an eleven-element sub-set of a 16-element set generated as follows: the first four bits of each successive element in the set increments from 0 to 15 in binary. The second four bits of each element provide the minimum Hamming distance protection and are either 1) a duplication of the first four bits when the parity of the first four bits is even, or 2) the complement of the first four bits when the parity of the first four bits is odd. The 16-element set is optimum in that it provides for a very simple implementation with low gate delay and latency.

It should be noted that the error correction decoder will correct bit errors prior to the decoder such that the decoder can reliably use the single bit header for deciding whether the block contains information or control words. Furthermore when the error correction decoder fails to correct the bit errors, the error correction decoder and/or the CRC check may flag the affected blocks such that they will replaced by error symbols (E) such that they will not be incorrectly decoded.

Figure 8:
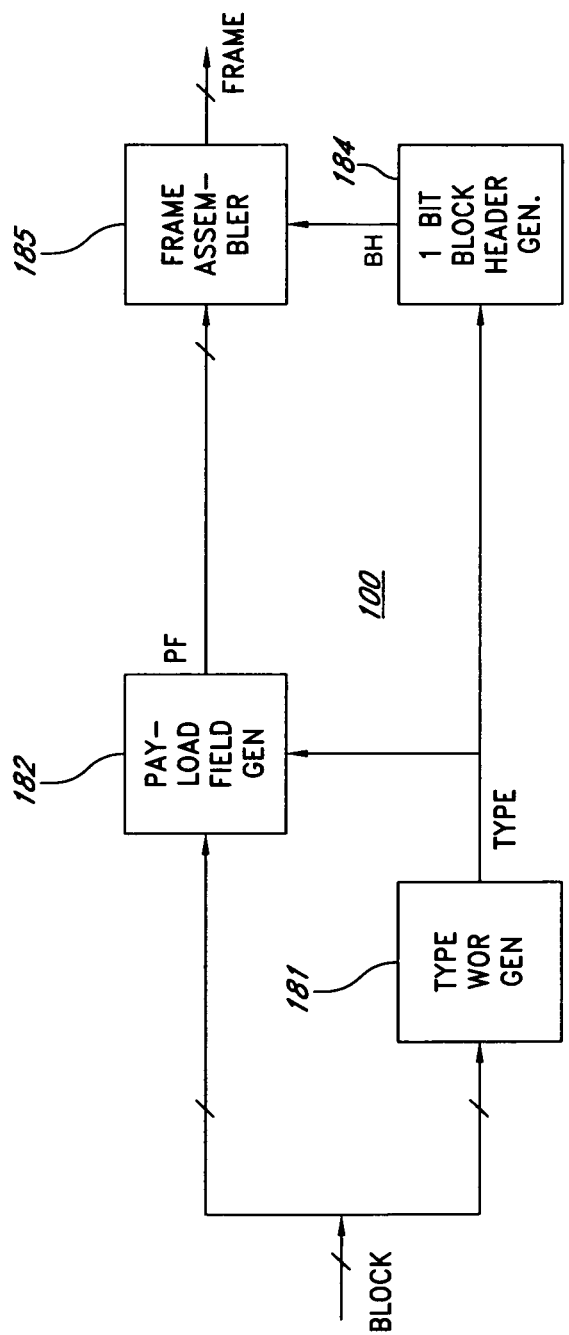
FIG. 8 is a block diagram showing a first embodiment of a coder according to the invention.

FIG. 8 is a block diagram showing a first embodiment of the encoder 100 according to the invention. The encoder is composed of the type word generator 181, the payload field generator 182, one bit the block header generator 184 and the frame assembler 185.

In the encoder 100, the type word generator 181 and the payload field generator 182 are connected to receive blocks of input data from the 4.times.8b/10b decoder 32 via the pseudo-XGMII bus 42 (FIG. 1E). The input data are composed of control words and a packet of information words. The packet is preceded and followed by the control words. In the preferred embodiment, the blocks are eight words, i.e., 64 bits, long and are smaller than the smallest size of the packet. The blocks are also smaller than the number of control words between consecutive packets. The encoder processes the input data block-by-block to generate respective frames for transmission.

The type word generator 181 generates a TYPE word whose value indicates one of the following mutually-exclusive structural properties of the block: 1) whether the block is composed exclusively of control words, 2) a position of the start of the packet in the block and 3) a position of the end of the packet in the block and 4) whether the block is composed exclusively of information words. The type word generator feeds the TYPE word to the payload field generator 182 and the one bit block header generator 184. The value of the TYPE word that indicates whether the block is composed exclusively of information words may take the form of a flag bit fed to the block header generator 184 and, optionally, to the payload field generator 182.

The payload field generator 182 operates in response to the TYPE word. When the TYPE word indicates that the block is composed exclusively of information words, the payload field generator adopts the block to form a payload field. Otherwise, when the TYPE word indicates that the block is not composed exclusively of information words, the payload field generator condenses the block and inserts the TYPE word into the block to form the payload field.

The payload field generator 182 condenses the block by performing one or both of the following operations: 1) removing any start-of-packet control word or an end-of-packet control word from the block, and 2) re-coding any other control words in the block using fewer bits. In the preferred embodiment, the control words are re-coded using seven-bit codes having a mutual Hamming distance of four bits. Whether the payload field generator simply adopts the block as the payload field, or processes the block further before forming the payload field may be determined by the above-mentioned flag bit in lieu of the full TYPE word. The TYPE word indicates the location in the block of the start-of-packet control word or the end-of-packet control word (if any) and the locations in the block of the other control words (if any).

The payload field generator 182 feeds the payload field PF generated from the block to the frame assembler 185.

The one bit block header generator 184 operates in response to the TYPE word, or, alternatively, to the flag bit described above, and generates the one bit block header. The one bit block header generator generates the block header in a first sense when the TYPE word, or flag bit, indicates that the block is composed exclusively of information words. Otherwise, when the TYPE word, or flag bit, indicates that the block is not composed exclusively of information words, the block header generator generates the block header in a second sense, opposite to the first sense. In the preferred embodiment, the one bit block header in the first sense is '1', and the one bit block header in the second sense is '0'. Transitions opposite to those shown could alternatively be used. The one bit block header generator 184 feeds the block header BH to the frame assembler 185.

The frame assembler 185 receives the payload field from the payload field generator 182 and the one bit block header from the one bit block header generator 184 and appends the one bit block header to the payload field to form the frame for transmission. The frame assembler preferably locates the one bit block header before the payload field, but could alternatively locate the one bit block header after the payload field. The frame assembler feeds the 65-bit frame to one or more additional processing elements 35A via the bus 44 (FIG. 1E).

Figure 9A:
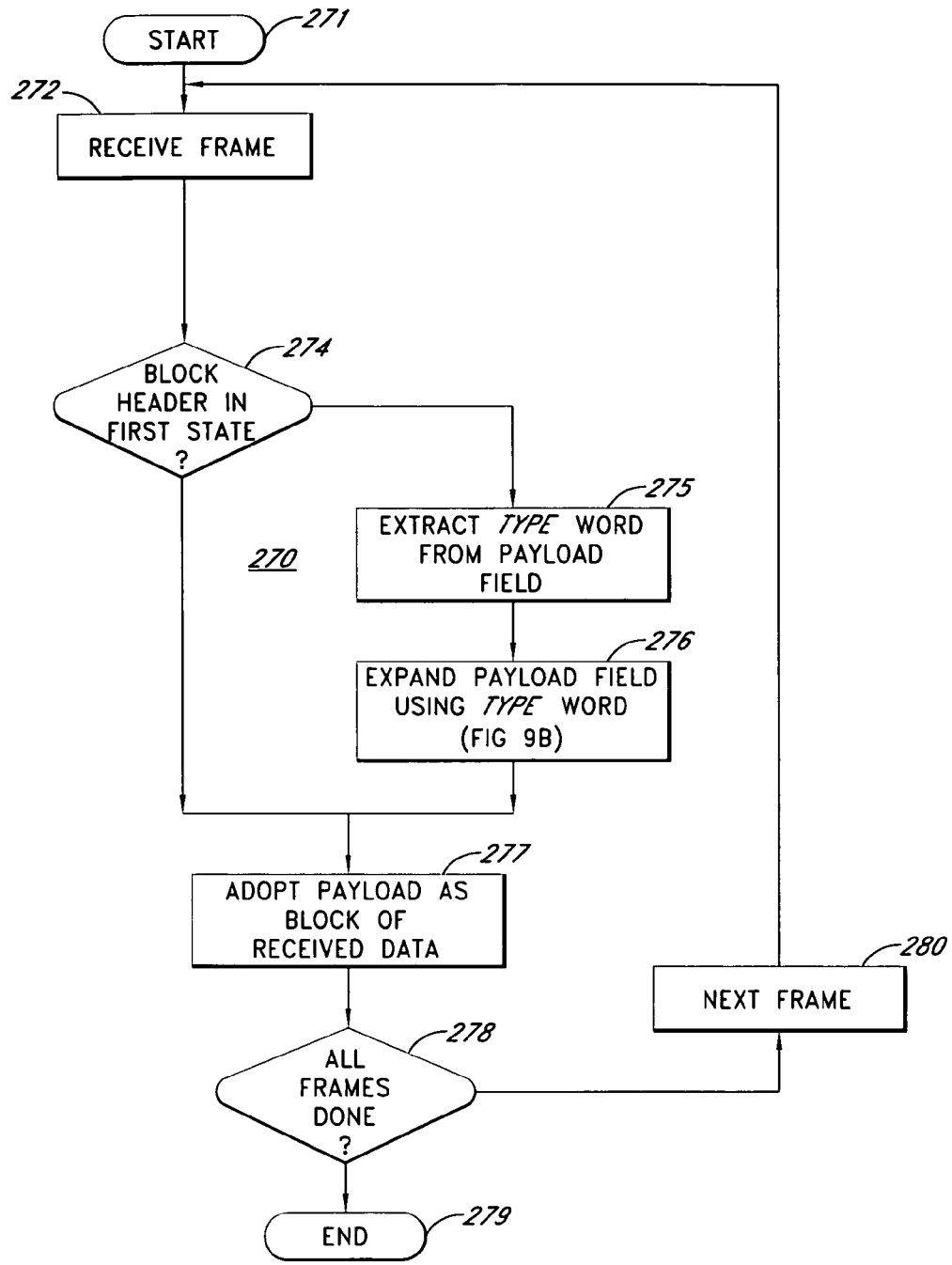
FIG. 9A is a flow chart showing an example of a decoding method for decoding the frames generated by the coding method and coder according to the invention.

FIG. 9A is a flow chart showing an example 280 of a decoding method for decoding the frames generated by the coding method and coder according to the invention. The method starts in process 271. In process 272, a frame is received from the demultiplexer 36 via the bus 45. In process 274, a test is performed on the block header of the frame to determine whether the one bit block header is in the first state. The first state is '1' in the preferred embodiment. When the test result is YES, which indicates that the payload field of the frame is composed exclusively of information words, execution advances to process 277, which will be described below. When the test result is NO, execution advances to process 275.

A NO result in process 274 indicates that the payload field of the frame is not composed exclusively of information words, and therefore includes a TYPE word. In process 275, the TYPE word is extracted from the payload field.

In process 286, the payload field of the frame is expanded using the information provided by the TYPE word regarding the structure of the payload field. Expanding the payload field reverses the condensing that was applied by the encoder to the block from which the frame was generated. Thus, when the payload field is expanded, the coded control words are re-coded to yield eight-bit control words. Additionally, when the start of the packet or the end of the packet appears in the payload field, a start-of-packet control word or an end-of-packet control word, respectively, is inserted into the payload field. As noted above, the TYPE word indicates what portion of the payload field is occupied by coded control words, and the location in the payload field of the start of the packet or the end of packet. The processing performed in process 276 will be described in more detail below with reference to FIG. 9B. Execution then advances to process 277. In process 277 the payload field is adopted as a block of received data.

In process 278, a test is performed to determine whether all frames have been processed. When the test result is YES, execution advances to process 279, where it ends. When the test result is NO, execution returns to process 272 via process 280 so that the next frame can be processed.

Figure 9B:
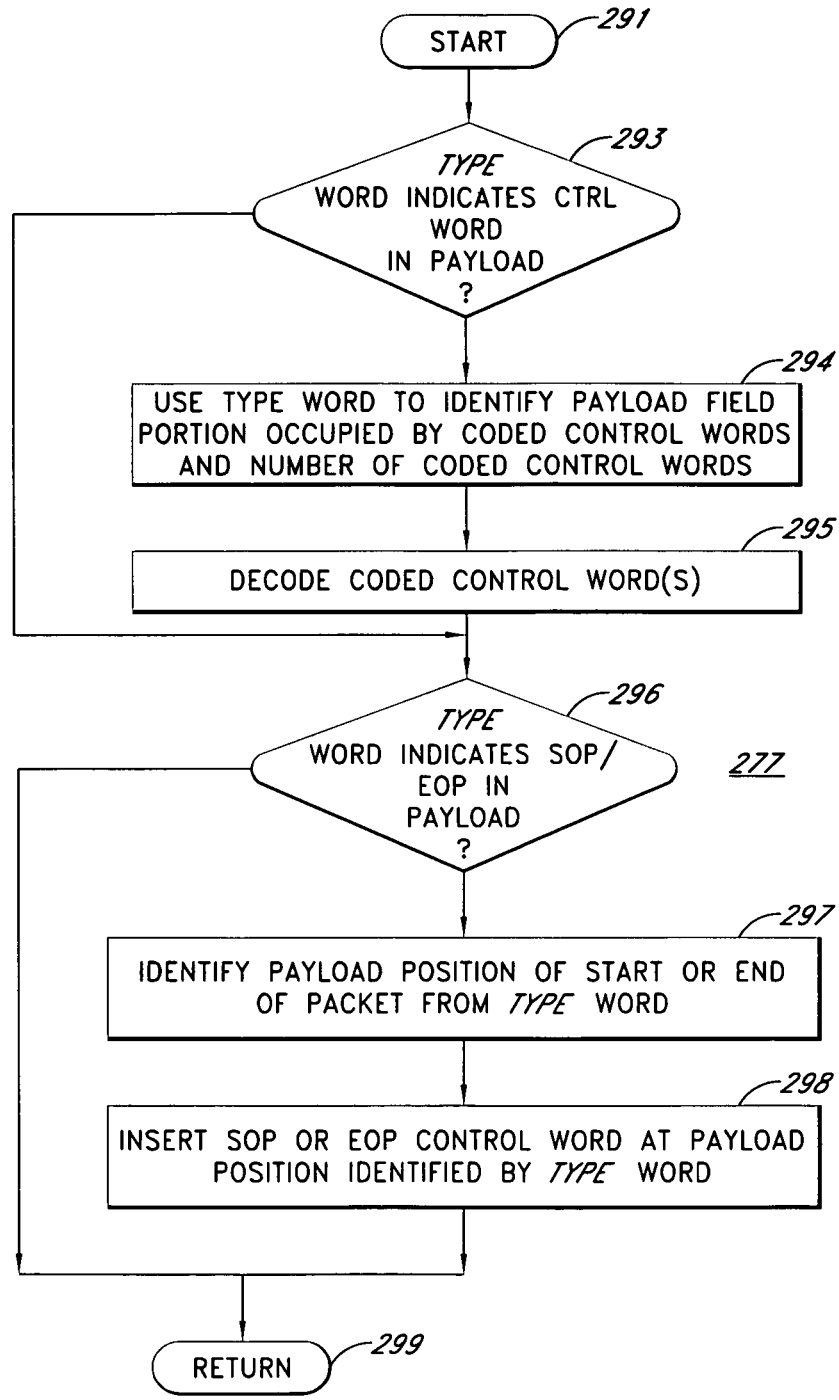
FIG. 9B is a flow chart showing an example of the processing performed in process 276 of the method shown in FIG. 9A.

Process 276 of the method described above with reference to FIG. 9A will now be described with reference to FIG. 9B where execution starts at process 291.

In process 293, a test is performed to determine whether the TYPE word indicates that any coded control words appear in the payload field, i.e., whether the encoder 100 derived the payload field from a Type 2 block or a Type 4 through Type 11 block. When the test result is NO, execution advances to process 296, which will be described below. When the test result is YES, execution advances to process 294.

In process 294, the TYPE word is used to identify the portion of the payload field occupied by one or more coded control words, and the number of coded control words. It can be seen from FIGS. 7A-7L that the coded control words in the frame derived from each block Type differ in number but are always contiguous. However, in some frames, the coded control words abut the head of the payload field, whereas in others, the coded control words abut the end of the payload field. In process 295, the coded control words identified by process 294 are decoded to yield the original control words.

In process 296, a test is performed to determine whether the TYPE word indicates that a packet starts or ends in the payload field, i.e., whether the encoder 100 derived the payload field from a Type 3 through Type 12 block. When the test result is NO, this indicates that the payload field was derived from a Type 2 block. In this case, execution advances to process 299, which will be described below. When the test result is YES, execution advances to process 297.

In process 297, the position of the start of the packet or the end of the packet in the payload field is identified from the TYPE word. In process 298, an SOP control word S or an EOP control word T is inserted into the payload field. The control word inserted, i.e., whether the control word S or T is inserted, and the position in the payload field at which the SOP or EOP control word is inserted are defined by the TYPE word. Execution then advances to process 299.

In process 299, execution returns to the main routine. Either or both of the control word decoding performed in process 295 and the control word insertion performed in process 298 insert 8-bit control words into the payload field. This fills the space in the payload field formerly occupied by the TYPE word and, in some frames, fill bits.

Figure 10:
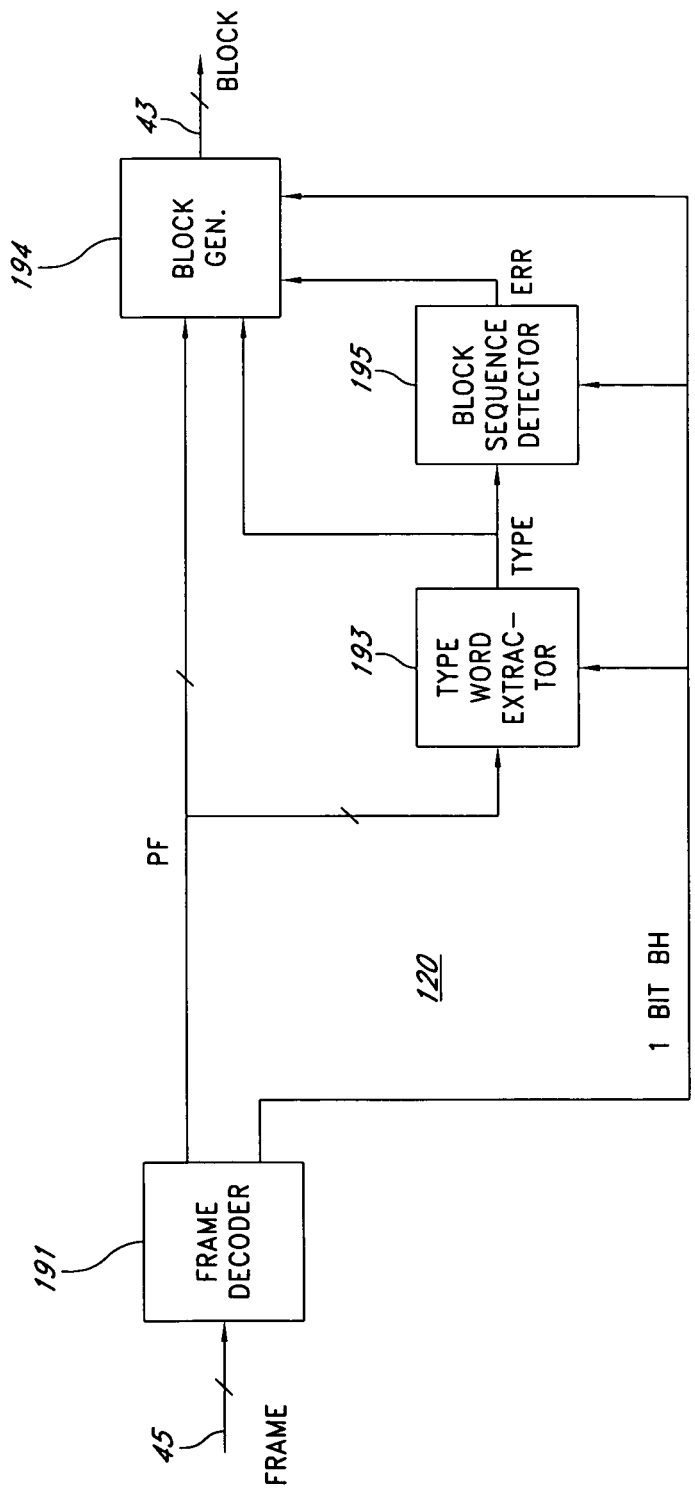
FIG. 10 is a block diagram showing a first embodiment of a decoder for decoding the frames generated by the coding method and coder according to the invention.

FIG. 10 is a block diagram showing a first embodiment of the decoder 120. The decoder is composed of the frame decoder 191, the type word extractor 193, the block generator 194 and the block sequence detector 195.

The frame decoder 191 receives each 65-bit frame from the demultiplexer 36 via the 65-bit bus 45 (FIG. 1). The frame decoder reads the one bit block header at the front of the frame and feeds the one bit block header BH to the type word extractor 193. The frame decoder feeds the remaining 64 bits constituting the payload field PF of the frame to the type word extractor 193 and the block generator 194.

The type word extractor 193 receives the payload field PF and additionally receives the one bit block header BH from the frame decoder 191. The type word extractor operates only when the one bit block header is in its second state, corresponding to a frame whose payload field is not composed exclusively of information words. The type word extractor extracts the TYPE word from the sub-field 157 of the payload field 152 (FIG. 4C) and feeds the TYPE word to the block generator 194 and the block sequence detector 195.

The block generator 194 receives the payload field PF, the TYPE word from the type word extractor 193 and the one bit block header BH from the frame decoder 191. The block generator operates in response to the one bit block header. When the one bit block header is in the first state, the block generator adopts the payload field PF as a block of received data. When the block header is in the second state, the block generator expands the payload field using the information provided by the type word regarding the structure of the payload field. Expanding the payload field reverses the condensing that was applied by the encoder to the block from which the frame was generated. Thus, when the payload field is expanded, the coded control words are re-coded to yield eight-bit control words. Additionally, when the start of the packet or the end of the packet appears in the payload field, a start-of-packet control word or an end-of-packet control word, respectively, is inserted into the payload field. As noted above, the TYPE word indicates what portion of the payload field is occupied by coded control words, and the location in the payload field of the start of the packet or the end of packet. Finally, the block generator adopts the payload field after expansion as the block of received data.

The block generator 194 feeds the block of received data to the 4.times.8b/10b decoder 120 via the bus 43 (FIG. 1).

The decoder also includes the block sequence detector 195. The block sequence detector receives the TYPE word from the type word extractor 193 and the one bit block header BH from the frame decoder 191. The one bit block header of a frame and the TYPE word of the frame, when present, collectively define what kind of frame the frame is. As noted above, the frame can be one of four different kinds, namely, one composed exclusively information words D (generated from Type 1 block), one that includes the start of a packet S (generated from Type 3 or Type 4 block), one that includes the end of a packet T (generated from one of Type 5 through Type 12 block) and one composed exclusively control words Z (generated from Type 2 block). The encoder generates the four different kinds of frames in a predetermined order, namely: S, D, . . . , D, T, Z, . . . , Z, S, D, . . . , D, T, Z, . . . , Z, etc. The frames must be received by the decoder 120 in the same predetermined order. The block sequence detector monitors the order of the kinds of frame received, and generates the error flag ERR when the TYPE word and the one bit block header indicate that the frame is of a kind that violates the predetermined order. The block generator 194 adds the error control word E to the block of received data generated from the frame in response to the error signal. The error control word causes the MAC 12 (FIG. 1) to void the packet of which the block forms part.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

The invention claimed is:

1. A 64B/65B coding method for coding a packet of information words into frames for transmission over 4 twisted pair conductor, the method comprising:
   receiving blocks of input data, the input data including control words and the packet of information words, the packet having (a) a start preceded by ones of the control words and (b) an ending followed by others of the control words, the blocks being smaller than the packet;
   determining when a block consists exclusively of information words and:
      when the block consists exclusively of information words, appending to the block a one bit block header having a first sense to form one of the frames;
      when the block does not consist exclusively of information words:
         condensing the block to accommodate a TYPE word, generating the TYPE word to have a value that indicates one of the following structural properties of the block:
            (a) a position of the start of the packet in the block,
            (b) a position of the end of the packet in the block, and
            (c) the block being composed exclusively of control words, inserting the TYPE word into the block, and
         appending to the block a one bit block header having a second sense, opposite to the first sense, to form the one of the frames,
   performing forward error correction (FEC) on the frames to generate FEC data; wherein the method reduces overhead to less than 3%.

2. The method of claim 1, in which compressing the block includes re-coding ones of the control words using fewer bits.

3. The method of claim 1, in which the TYPE word is selected from a set of TYPE words having a specified mutual Hamming distance.

4. The method of claim 3, in which: the TYPE words each consist of T bits; and the method additionally comprises generating the set of possible bit patterns by a process including: adopting a (T12)-bit binary pattern as a first half of a bit pattern in the set of possible bit patterns, and generating a second half of the bit pattern by duplicating or complementing the first half of the bit pattern depending on a bit parity value of the first half of the bit pattern.

5. The method of claim 1, wherein a one bit block header in the first sense comprises a 1, and wherein a one bit block header in the second sense comprises a 0 value.

6. The method of claim 1, in which condensing the block includes removing from the block a control word that indicates one of (a) the start of the packet and (b) the end of packet.

7. The method of claim 6, in which condensing the block includes re-coding remaining ones of the control words using fewer bits.

8. The method of claim 1, wherein the method is utilized in a 10 gigabit/second communication system.

9. A communication coder for 64B/65B type coding of blocks of input data into respective frames for transmission over twisted pair conductor, the input data including control words and a packet of information words, the packet having (a) a start preceded by ones of the control words and (b) an ending followed by others of the control words, the blocks being smaller than the packet, the frames including a frame corresponding to the block, the coder comprising:
   a type word generator that receives the block and generates a TYPE word for a block, the TYPE word having a value that indicates one of the following structural properties of the block:
      (a) whether the block is composed exclusively of control words,
      (b) a position of the start of the packet in the block,
      (c) a position of the end of the packet in the block, and
      (d) whether the block is composed exclusively of control words;
   a one bit block header generator that (a) generates a one bit block header in a first sense when the TYPE word indicates that the block is composed exclusively of information words, and (b) otherwise generates the one bit block header in a second sense, opposite to the first sense, wherein use of a one bit block header reduces overhead to less than 3%;

a payload field generator that adopts the block to form a payload field of the frame when the TYPE word indicates that the block is composed exclusively of information words, and that otherwise condenses the block and inserts the TYPE word into the block to form the payload field;

a frame assembler that appends the block header to the payload field to form the frame; and a forward error correction coder configured to perform forward error correction coding on a group of two or more frames.

10. The coder of claim 9, in which the payload field generator includes a re-coder that condenses the block by re-coding remaining ones of the control words using fewer bits.

11. The coder of claim 9, in which the TYPE word is selected from a set of TYPE words having a specified mutual Hamming distance.

12. The coder of claim 11, in which: the TYPE words each consist of T bits; and the coder additionally comprises a type word generator that generates the set of possible bit patterns, the type word generator including:

a first-half generator that adopts a bit binary pattern as a first half of a bit pattern in the set of possible bit patterns, and a second-half generator that generates a second half of the bit pattern by duplicating or complementing the first half of the bit pattern depending on a bit parity value of the first half of the bit pattern.

13. The coder of claim 9, wherein the twisted pair conductors comprise 4 twisted pair conductors, and wherein use of a one bit block header by the communication coder establishes a overhead of 1.5625%.

14. The coder of claim 9, in which the payload field generator includes a control word removal module that condenses the block by removing from the block a control 15 that indicates one of (a) the start of the packet and (b) the end of the packet.

15. The coder of claim 14, in which the payload field generator additionally includes a re-coder that condenses the block by re-coding remaining ones of the control words using fewer bits.

16. The coder of claim 15, in which the re-coder re-codes the control words using codes having a specified mutual Hamming distance.

* * * * *